(12) United States Patent
Tang

(10) Patent No.: US 11,113,288 B2
(45) Date of Patent: Sep. 7, 2021

(54) ADVERTISEMENT DELIVERY SYSTEM WITH LOCATION BASED CONTROLLED PRIORITY MECHANISM AND METHOD OF OPERATION THEREOF

(75) Inventor: Ky Tang, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 569 days.

(21) Appl. No.: 12/965,460

(22) Filed: Dec. 10, 2010

(65) Prior Publication Data

US 2012/0150853 A1    Jun. 14, 2012

(51) Int. Cl.
*G06F 16/2457*  (2019.01)

(52) U.S. Cl.
CPC ............... *G06F 16/24575* (2019.01)

(58) Field of Classification Search
USPC .......................................................... 707/732
See application file for complete search history.

(56) References Cited

U.S. PATENT DOCUMENTS

| | | | |
|---|---|---|---|
| 6,009,410 A | 12/1999 | LeMole et al. | |
| 6,484,148 B1 | 11/2002 | Boyd | |
| 6,560,578 B2 | 5/2003 | Eldering | |
| 6,571,279 B1 | 5/2003 | Herz et al. | |
| 6,684,249 B1 | 1/2004 | Frerichs et al. | |
| 6,895,387 B1 | 5/2005 | Roberts et al. | |
| 6,907,566 B1 | 6/2005 | McElfresh et al. | |
| 7,007,074 B2 | 2/2006 | Radwin | |
| 7,136,871 B2 | 11/2006 | Ozer et al. | |
| 7,155,508 B2 | 12/2006 | Sankuratripati et al. | |
| 7,668,832 B2 | 2/2010 | Yeh et al. | |
| 8,433,512 B1* | 4/2013 | Lopatenko | G01C 21/20 701/400 |
| 8,463,772 B1* | 6/2013 | Aminzade | G06F 17/3087 707/723 |
| 8,938,446 B2* | 1/2015 | Seefeld | 707/722 |
| 9,194,716 B1* | 11/2015 | Cutter | G01C 21/3679 |
| 2007/0165805 A1 | 7/2007 | Altberg et al. | |
| 2008/0028066 A1 | 1/2008 | Berkhin et al. | |
| 2008/0032703 A1* | 2/2008 | Krumm et al. | 455/456.1 |
| 2008/0214156 A1* | 9/2008 | Ramer et al. | 455/414.1 |
| 2009/0319175 A1 | 12/2009 | Khosravy et al. | |
| 2010/0168996 A1 | 7/2010 | Bourque et al. | |
| 2010/0305842 A1 | 12/2010 | Feng | |
| 2011/0010245 A1* | 1/2011 | Priebatsch et al. | 705/14.58 |

OTHER PUBLICATIONS

International Search Report for Application No. PCT/US2010/059961 dated Feb. 8, 2011.

* cited by examiner

*Primary Examiner* — James Trujillo
*Assistant Examiner* — Kurt A Mueller
(74) *Attorney, Agent, or Firm* — Perspectives Law Group, Corp.

(57) ABSTRACT

A method of operation of an advertisement delivery system includes: receiving a selection for a category of interest; generating search results for the selection, the search results based on a current location for locating a device providing the selection; generating a weighted distance based on distances of the search results from the current location; generating a weighted relevancy based on relative matches of the search results and the selection; generating a weighted customization with the search results sharing a common attribute that is predefined; and delivering a notification from the search results by an aggregation of the weighted distance, the weighted relevancy, and the weighted customization, the aggregation meeting or exceeding a threshold for displaying on the device.

20 Claims, 9 Drawing Sheets

FIG. 5 (502, 206)

| | 1M | 3M | 5M | 10M |
|---|---|---|---|---|
| FF | 10 | 8 | 6 | 1 |
| CN | 10 | 8 | 6 | 1 |
| JP | 10 | 8 | 6 | 1 |
| IT | 10 | 8 | 6 | 1 |
| MX | 10 | 8 | 6 | 1 |
| ST | 10 | 8 | 6 | 1 |

FIG. 6 (602, 204, 202)

| | FF | CN | JP | IT | MX | ST |
|---|---|---|---|---|---|---|
| FF | 10 | 6 | 1 | 0 | 9 | 0 |
| CN | 6 | 10 | 9 | 7 | 2 | 5 |
| JP | 1 | 9 | 10 | 4 | 0 | 0 |
| IT | 0 | 7 | 4 | 10 | 8 | 3 |
| MX | 9 | 2 | 0 | 8 | 10 | 6 |
| ST | 0 | 5 | 0 | 3 | 6 | 10 |

FIG. 7 (702, 206)

| | 5 | 4 | 3 | 2 | 1 |
|---|---|---|---|---|---|
| RST | 50 | 25 | 10 | 5 | 1 |
| TH | 10 | 8 | 5 | 3 | 1 |
| GYM | 10 | 8 | 5 | 3 | 1 |
| CAR | 5 | 4 | 3 | 2 | 1 |
| DC | 10 | 8 | 5 | 3 | 0 |
| GAS | 10 | 8 | 5 | 3 | 1 |

ADVERTISEMENT DELIVERY SYSTEM WITH LOCATION BASED CONTROLLED PRIORITY MECHANISM AND METHOD OF OPERATION THEREOF

TECHNICAL FIELD

The present invention relates generally to an advertisement delivery system, and more particularly to a system for location based controlled priority notification delivery.

BACKGROUND ART

Modern portable consumer and industrial electronics, especially client devices such as navigation systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, an advertisement delivery system that cannot provide accurate information based on a scalable notification delivery mechanism has become a paramount concern for the consumer. An advertisement delivery system without a useful notification can decrease the benefit of using the tool.

Thus, a need still remains for an advertisement delivery system with location based controlled priority mechanism that provides scalable notification for delivering accurate information. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an advertisement delivery system including: receiving a selection for a category of interest; generating search results for the selection, the search results based on a current location for locating a device providing the selection; generating a weighted distance based on distances of the search results from the current location; generating a weighted relevancy based on relative matches of the search results and the selection; generating a weighted customization with the search results sharing a common attribute that is predefined; and delivering a notification from the search results by an aggregation of the weighted distance, the weighted relevancy, and the weighted customization, the aggregation meeting or exceeding a threshold for displaying on the device.

The present invention provides an advertisement delivery system, including: an entry module for receiving a selection for a category of interest; a search result generator module, coupled to the entry module, for generating search results for the selection, the search results based on a current location for locating a device providing the selection; a weighted distance generator module, coupled to the search result generator module, for generating a weighted distance based on distances of the search results from the current location; a weighted relevancy generator module, coupled to the search result generator module, for generating a weighted relevancy based on relative matches of the search results and the selection; a weighted customization generator module, coupled to the search result generator module, for generating a weighted customization with the search results sharing a common attribute that is predefined; and a delivery module, coupled to the weighted customization generator module, for delivering a notification from the search results by an aggregation of the weighted distance, the weighted relevancy, and the weighted customization, the aggregation meeting or exceeding a threshold for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 5 shows an example of a location matrix for the advertisement delivery system.

FIG. 6 shows an example of a relevancy matrix for the advertisement delivery system.

FIG. 7 shows an example of a customization matrix for the advertisement delivery system.

BEST MODE FOR CARRYING OUT THE INVENTION

Figure 1:
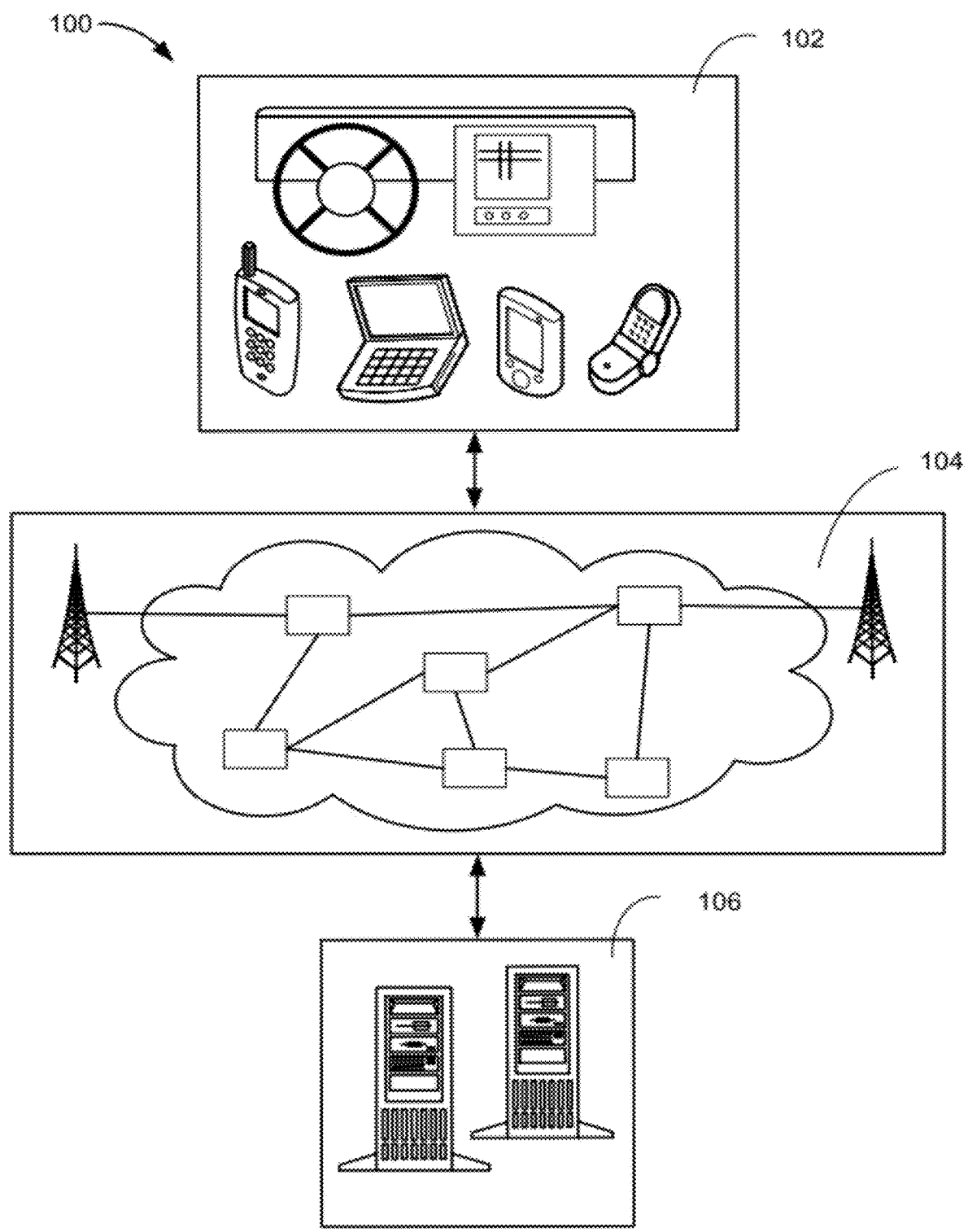
FIG. 1 is an advertisement delivery system with location based controlled priority mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an advertisement delivery system 100 with location based controlled priority mechanism in an embodiment of the present invention. The advertisement delivery system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the advertisement delivery system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the advertisement delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the advertisement delivery system 100 is shown with the second device 106 and the first device 102 as end points of the communication path 104, although it is understood that the advertisement delivery system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
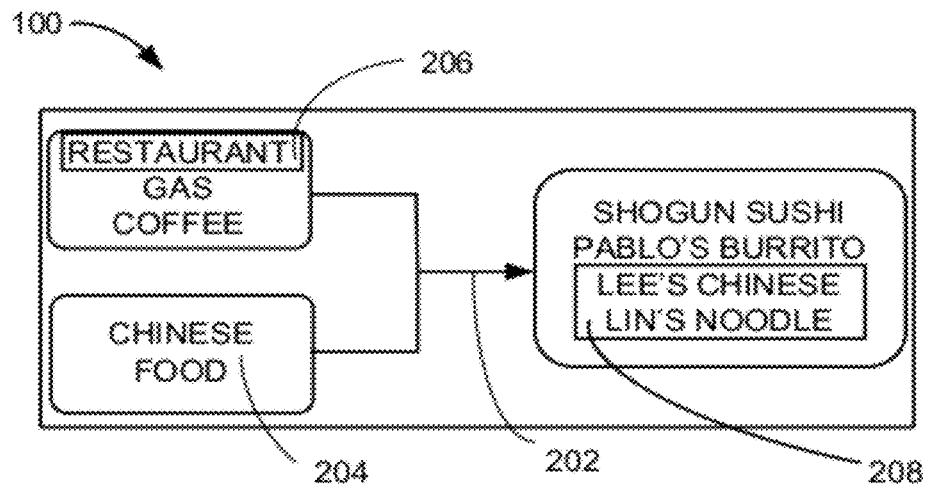
FIG. 2 shows an example of the advertisement delivery system generating search results based on a selection and a category of interest.

Referring now to FIG. 2, therein is shown an example of the advertisement delivery system 100 generating search results 202 based on a selection 204 and a category of interest 206. The selection 204 is defined as the user's entry into the advertisement delivery system 100. The category of interest 206 is defined as a broader classification of the selection 204. Examples of the category of interest 206 include coffee, restaurant, refueling station, or gym. The example in FIG. 2 depicts the user choosing "Chinese food" for the selection 204 out of the category of interest 206 representing "restaurant."

The search results 202 are defined as a list of results generated by the advertisement delivery system 100 based on the selection 204 and the category of interest 206. For example, based on the selection 204 for "Chinese food" and the category of interest 206 for "restaurant," the advertisement delivery system 100 can generate the following list of the search results 202: "Shogun Sushi," "Pablo's Burrito," "Lee's Chinese," and "Lin's Noodle." These are examples for the search results 202 for the category of interest 206 representing "restaurant." The details regarding the generation of the search results 202 will be discussed later.

Relative matches 208 are defined as the degree or level of pertinence of the search results 202 to the selection 204. Continuing from the previous example, out of the search results 202, "Lee's Chinese" and "Lin's Noodle" can be an exact match as for the relative matches 208 to the selection 204, because "Lee's Chinese" and "Lin's Noodle" are restaurants that are "Chinese food." In contrast, "Pablo's Burrito" is a low degree as for the relative matches 208 to the selection 204, because "Pablo's Burrito" is "Mexican food" and not "Chinese food." As a further contrast, "Shogun Sushi" can be a higher degree than "Pablo's Burrito" as for the relative matches 208 because "Shogun Sushi," although not Chinese food, is Japanese food and is still considered Asian food.

Figure 3:
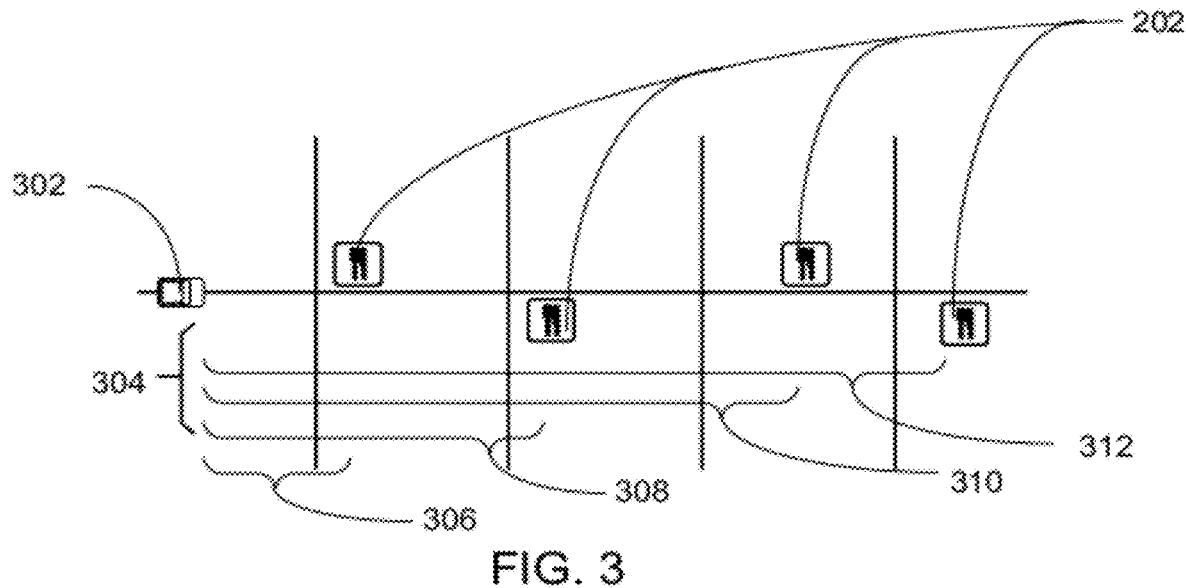
FIG. 3 shows an example of a geographic view of an application of the advertisement delivery system.

Referring now to FIG. 3, therein is shown an example of a geographic view of an application of the advertisement delivery system 100 of FIG. 1. A current location 302 is defined as the geographic location of the user operating the advertisement delivery system 100. Distances 304 are defined as the geographic distances for each of the search results 202 relative from the current location 302.

The distances 304 can include a first distance 306, a second distance 308, a third distance 310, and a fourth distance 312. The designation of "first," "second," "third," and "fourth" are for convenience and not intended to be limit the present invention to the strict order described in the following example.

For example, the first distance 306 can be shorter distance from the current location 302 than the second distance 308. The fourth distance 312 can be longer distance from the current location 302 than the third distance 310.

As a more specific example, the search results 202 can be "Shogun Sushi," "Pablo's Burrito," "Lee's Chinese," and "Lin's Noodle." The first distance 306 can represent the distance of "Shogun Sushi" from the current location 302. The fourth distance 312 can represent the distance of "Lin's Noodle" from the current location 302. Subsequently, "Lin's Noodle" can be further away in distance relatively than "Shogun Sushi" from the current location 302.

Figure 4:
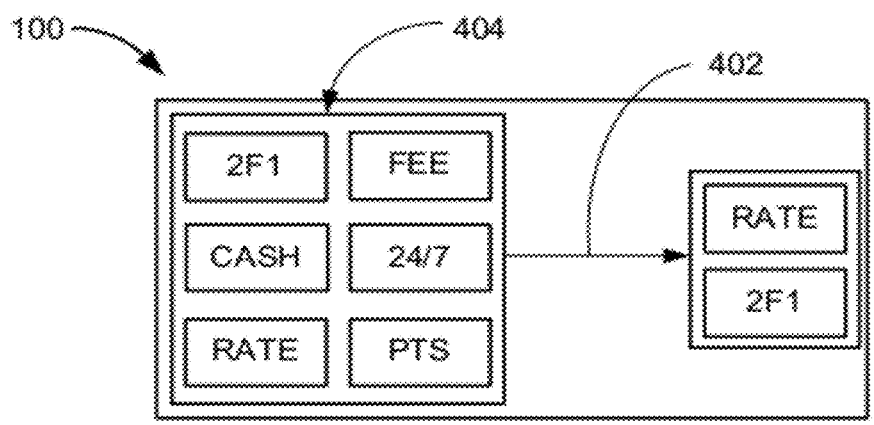
FIG. 4 shows an example of the advertisement delivery system selecting a common attribute from multiple predefined attributes.

Referring now to FIG. 4, therein is shown an example of the advertisement delivery system 100 selecting a common attribute 402 from multiple predefined attributes 404. The common attribute 402 is defined as properties or characteristics shared among the search results 202 of FIG. 2. The multiple predefined attributes 404 are defined as predetermined properties or characteristics where the advertisement delivery system 100 can select the common attribute 402 from. The details regarding defining the multiple predefined attributes 404 and selecting the common attribute 402 will be discussed later.

For example, the multiple predefined attributes 404 can represent "2 for 1 deal," "cash only," "rated," "fee entity," "24/7," and "accruable points." The advertisement delivery system 100 can select "rated," "2 for 1 deal," or the combination thereof as the common attribute 402 from the multiple predefined attributes 404. For a further example, the search results 202 can be "Shogun Sushi," "Pablo's Burrito," "Lee's Chinese," and "Lin's Noodle." Each of the search results 202 can share the common attribute 402 representing "rated," "2 for 1 deal," or the combination thereof.

Continuing with the example, the search results 202 having "rated" as the common attribute 402 can represent restaurants that have received ratings from rating organizations. More specifically, rating organization can include, for example, Zagat™, Michelin™, or Yelp.com™. The rating organizations can rate the restaurants based on, for example, the quality of the food, the service, and the ambiance.

Some example of the rating can include "5 stars," "4 stars," "3 stars," "2 stars," and "1 star," with "5 stars" representing the best quality. For this example, "Shogun Sushi," "Pablo's Burrito," "Lee's Chinese," and "Lin's Noodle" can share the common attribute 402 representing as having been "rated."

As a different example, the search results 202 having "2 for 1 deal" as the common attribute 402 can represent restaurants that have price of 1 meal for a purchase of 2 meals. More specifically, "Shogun Sushi," "Pablo's Burrito," "Lee's Chinese," and "Lin's Noodle" can share the common attribute 402 for having "2 for 1 deal."

As another example, the search results 202 having "fee entity" as the common attribute 402 can represent restaurants that have paid fees to advertise the restaurant. More specifically, "Shogun Sushi," "Pablo's Burrito," "Lee's Chinese," and "Lin's Noodle" can share the common attribute 402 representing "fee entity" for having paid the fees to advertise their restaurants.

Referring now to FIG. 5, therein is shown an example of a location matrix 502 for the advertisement delivery system 100 of FIG. 1. The location matrix 502 is defined as the profile for the values assigned to the distances 304 of FIG. 3 based on the proximity of the each of the search results 202 of FIG. 2 from the current location 302 of FIG. 3. As an example, the value can be numerical, ranging from 0 to 10 with 10 representing the highest preference for having the selection 204 of FIG. 2 to be closer proximity to the current location 302 than further away. The value can be represented by other metrics, such as alphabetical "A," "B," "C," "D," and "F," with "A" representing the highest preference for having the selection 204 to be closer proximity to the current location 302 than further away.

In this example, the left hand column can represent the types of restaurants for the category of interest 206. The left hand column denoted as "FF," "CN," "JP," "IT," "MX," and "ST" can represent the restaurants for fast food, Chinese, Japanese, Italian, Mexican, and steak house, respectively. The top row denoted as "1M," "3M," "5M," and "10M" can represent the distances 304 of the restaurants from the current location 302 as within 1 mile, 3 miles, 5 miles, or 10 miles, respectively.

The entries in the location matrix 502 can differ based on the proximity of the restaurant from the current location 302. For example, the advertisement delivery system 100 can assign the value of "10" for all types of restaurants that are within one mile from the current location 302. The advertisement delivery system 100 can assign the value of "1" for all types of restaurants that are within ten mile from the current location 302.

Referring now to FIG. 6, therein is shown an example of a relevancy matrix 602 for the advertisement delivery system 100 of FIG. 1. The relevancy matrix 602 is defined as the profile for the values assigned to the relative matches 208 of FIG. 2 based on the relative matches 208 between the selection 204 and the search results 202.

For example, the value of the relative matches 208 can differ based on the degree of the relative matches 208 between the selection 204 and the search results 202. As an example, the value can be numerical, ranging from 0 to 10 with 10 having the highest degree of matching between the selection 204 and the search results 202. The value can be represented by other metrics, such as alphabetical "A," "B," "C," "D," and "F," with "A" having the highest degree of matching between the selection 204 and the search results 202.

In this example, the left hand column can represent the types of food the user can choose for the selection 204. The left hand column denoted as "FF," "CN," "JP," "IT," "MX," and "ST" can represent fast food, Chinese, Japanese, Italian, Mexican, and steak house respectively selected by the user for the selection 204.

Continuing with the example, the top row can represent the types of restaurant generated for the search results 202. The top row denoted as "FF," "CN," "JP," "IT," "MX," and "ST" can represent fast food, Chinese, Japanese, Italian, Mexican, and steak house respectively generated by the advertisement delivery system 100 for the search results 202.

If the selection 204 represents "Chinese food" and the search results 202 represent "Chinese restaurant," the relative matches 208 can be an exact match. The highest value of "10" can be assigned for the exact match. In contrast, if the selection 204 represents "Chinese food" and the search results 202 represent "Mexican food," because "Chinese food" and "Mexican food" are not similar, a lower value of "2" can be assigned to represent the low degree of the relative matches 208.

As a further contrast, if the selection 204 represents "Chinese food" and the search results 202 represent "Japanese food," although the search results 202 do not represent "Chinese food," because "Japanese food" and "Chinese food" are both considered Asian food, a higher value of "9" can be assigned to represent the high degree of the relative matches 208. The details of the assignment of the value will be discussed later.

Referring now to FIG. 7, therein is shown an example of a customization matrix 702 for the advertisement delivery system 100 of FIG. 1. The customization matrix 702 is defined as the profile for the values assigned to the common attribute 402 of FIG. 4 shared by each of the search results 202 of FIG. 2.

For example, the value of the common attribute 402 can differ based on the content of the common attribute 402 shared by each of the search results 202. The value can be numerical, ranging from 0 to 50 with 50 having the highest appraisal for the content of the common attribute 402. The value can be represented by other metrics, such as alphabetical "A," "B," "C," "D," and "F," with "A" having the highest appraisal for the content of the common attribute 402.

In this example, the left hand column can represent different types of the category of interest 206. For a further example, the left hand column denoted as "RST," "TH," "GYM," "CAR," "DC," and "GAS" can represent restaurant, theater, gym, car dealer, dry cleaner, and gas station respectively for the category of interest 206.

As one example, the top row denoted as "5 stars," "4 stars," "3 stars," "2 stars," and "1 star" can represent the categorization for the values to be assigned for the category of interest 206. For example, a categorization by "stars" can be one way to appraise the common attribute 402. For this example, the higher the appraisal, the more "star" the common attribute 402 can have. The more "star" the common attribute 402 has, the greater the value can be assigned to the common attribute 402.

For a specific example, the user can select "Chinese food" for the selection 204 from the category of interest 206 representing "restaurant." The advertisement delivery system 100 can generate the search results 202 having "rated" as the common attribute 402 as described in FIG. 4. The search results 202 can be "Shogun Sushi," "Pablo's Burrito," "Lee's Chinese," and "Lin's Noodle." Each of the search results 202 can share the common attribute 402 representing "rated" and can have the following rating: "Lin's Noodle=5 stars;" "Shogun Sushi=4 stars;" "Lee's Chinese=3 stars;" and "Pablo's Burrito=2 stars." In this example, "Lin's Noodle" was rated the highest.

As a different example, the search results 202 can share the common attribute 402 representing "fee entity," as described in FIG. 4. The top row denoted as "5 stars," "4 stars," "3 stars," "2 stars," and "1 star" can represent the amount of fees paid for advertisement. The search results 202 can represent the following: "Lin's Noodle=5 stars;" "Shogun Sushi=4 stars;" "Lee's Chinese=3 stars;" and "Pablo's Burrito=2 stars." In this example, "Lin's Noodle" had paid the most for fees and "Pablo's Burrito" had paid the least amount of fees for the advertisement.

Continuing with the example, the customization matrix 702 can assign value for the category of interest 206 representing "restaurant" according to the following: "5 stars=50," "4 stars=25," "3 stars=10," "2 stars=5," and "1 star=1." For this example, the following value can be assigned to the search results 202: "Lin's Noodle=50;"

"Shogun Sushi=25;" "Lee's Chinese=10;" and "Pablo's Burrito=5." The details regarding the assignment of the value will be discussed later.

Figures 8, 9:
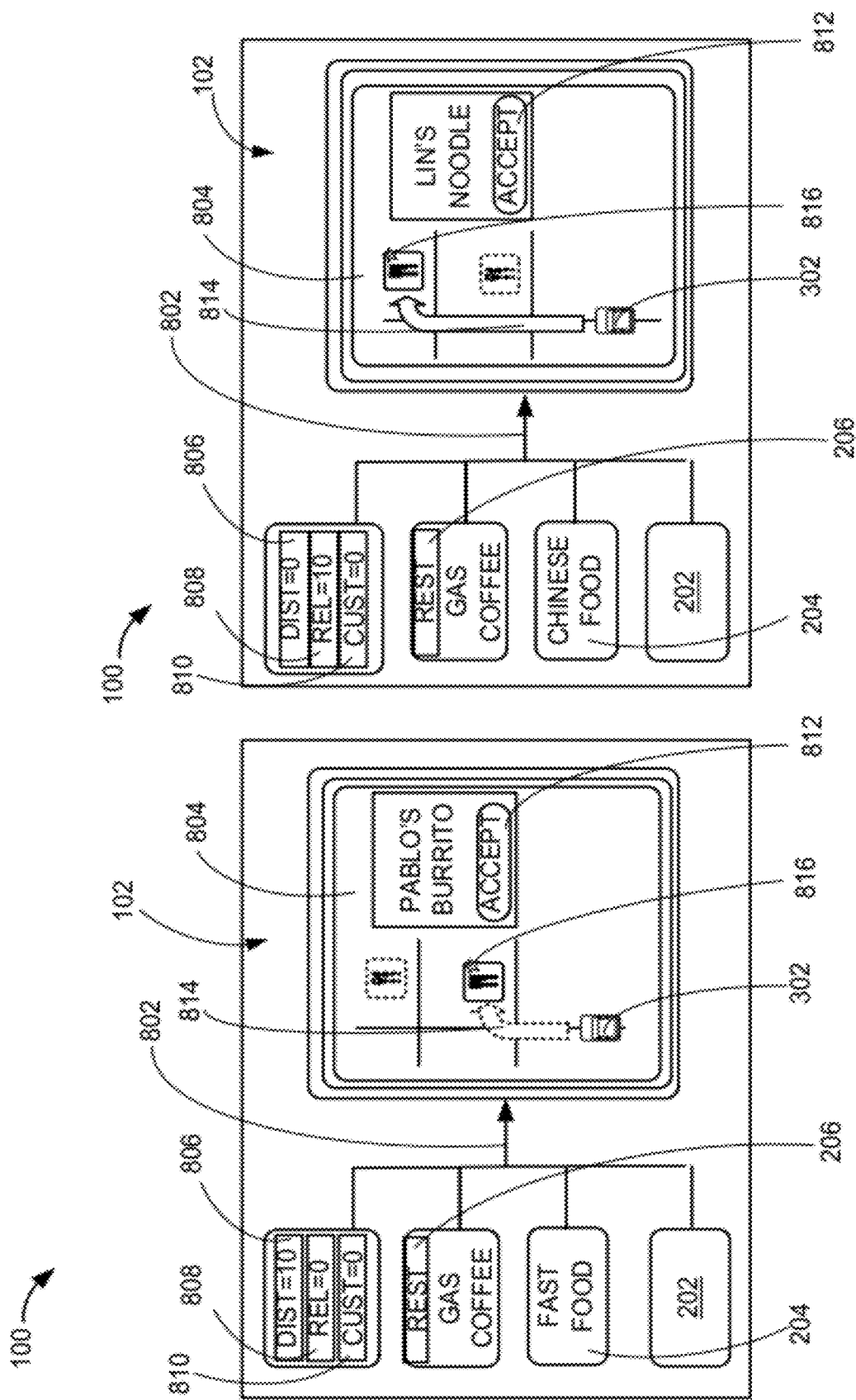
FIG. 8 shows a first example of the advertisement delivery system delivering a notification on a display interface of the first device.
FIG. 9 shows a second example of the advertisement delivery system delivering the notification on the display interface of the first device.

Referring now to FIG. 8, therein is shown a first example of the advertisement delivery system 100 delivering a notification 802 on a display interface 804 of the first device 102. The notification 802 is defined as a visual message, an audio message, or the combination thereof delivered to the user traveling on the vehicle with the advertisement delivery system 100. The notification 802 can include an advertisement, an alert, a bulletin, a communication, a warning, or a combination thereof.

The advertisement delivery system 100 can deliver the notification 802 based on the search results 202, the selection 204, the category of interest 206, or the combination thereof. The advertisement delivery system 100 can also deliver the notification 802 based on a distance priority 806, a relevancy priority 808, a customization priority 810, or a combination thereof. The details regarding the advertisement delivery system 100 delivering the notification 802 will be discussed later.

The distance priority 806 is defined as the value to prioritize the delivery of the notification 802 by the advertisement delivery system 100 based on the relative proximity of each possible point of interests to the current location 302. For example, the advertisement delivery system 100 can prioritize the delivery of the notification 802 based on the distances 304 of the search results 202 from the current location 302 by increasing the value of the distance priority 806. The higher the value for the distance priority 806, the more likely the advertisement delivery system 100 will deliver the notification 802 based on the distances 304. The value can be numerical, ranging from 0 to 10 with 10 having the highest priority for delivering the notification 802. The value can be represented by other metrics, such as alphabetical "A," "B," "C," "D," and "F," with "A" having the highest priority for delivering the notification 802. The details regarding the advertisement delivery system 100 generating the distance priority 806 will be discussed later.

The relevancy priority 808 is defined as the value to prioritize the delivery of the notification 802 by the advertisement delivery system 100 based on the degree or level of pertinence of the relative matches 208 of FIG. 2 to the selection 204. For example, the advertisement delivery system 100 can prioritize the delivery of the notification 802 based on the relative matches 208 by increasing the value of the relevancy priority 808. The higher the value for the relevancy priority 808, the more likely the advertisement delivery system 100 will deliver the notification 802 based on the relative matches 208. The value can be numerical, ranging from 0 to 10 with 10 having the highest priority for delivering the notification 802. The value can be represented by other metrics, such as alphabetical "A," "B," "C," "D," and "F," with "A" having the highest priority for delivering the notification 802. The details regarding the advertisement delivery system 100 generating the relevancy priority 808 will be discussed later.

The customization priority 810 is defined as the value to prioritize the delivery of the notification 802 by the advertisement delivery system 100 based on the appraisal of the common attribute 402 of FIG. 4. For example, the advertisement delivery system 100 can prioritize the delivery of the notification 802 based on the common attribute 402 by increasing the value of the customization priority 810. The higher the value for the customization priority 810, the more likely the advertisement delivery system 100 will deliver the notification 802 based on the common attribute 402. The value can be numerical, ranging from 0 to 10 with 10 having the highest priority for delivering the notification 802. The value can be represented by other metrics, such as alphabetical "A," "B," "C," "D," and "F," with "A" having the highest priority for delivering the notification 802. The details regarding the advertisement delivery system 100 generating the customization priority 810 will be discussed later.

For a more specific example, the user can make an entry for the selection 204 representing "fast food" from the category of interest 206 representing "restaurant." The search results 202 can be the following restaurants: "Shogun Sushi," "Pablo's Burrito," "Lee's Chinese," and "Lin's Noodle." In this example, out of the search results 202, "Pablo's Burrito" can be closest in proximity from the current location 302 compared to other restaurants.

Continuing with the example, the distance priority 806 can have the value of "10." The relevancy priority 808 and the customization priority 810 can both have the value of "0." The value of the distance priority 806 is greater than both values of the relevancy priority 808 and the customization priority 810. Subsequently, in this example, the advertisement delivery system 100 can prioritize the delivery of the notification 802 based on the nearness of the distances 304 of the search results 202.

The notification 802 can include a notification acceptance 812. The notification acceptance 812 is defined as the functionality for the user to accept the notification 802. For example, the notification acceptance 812 can include a selection on the display interface 804, an audio reply, or the combination thereof. For a further example, by selecting the notification acceptance 812, the advertisement delivery system 100 can generate a route 814 for the user to reach a destination 816 from the current location 302.

The route 814 is defined as the pathway generated by the advertisement delivery system 100 to guide the user to reach the destination 816 from the current location 302. The destination 816 is defined as the geographic location for the content displayed on the notification 802, which the user had selected the notification acceptance 812 for.

For example, the advertisement delivery system 100 can deliver and display the notification 802 for "Pablo's Burrito" on the display interface 804. The user can select the notification acceptance 812 to accept the notification 802 for "Pablo's Burrito." Based on the acceptance, the advertisement delivery system 100 can generate the route 814 to reach "Pablo's Burrito" from the current location 302. "Pablo's Burrito" can represent the destination 816.

In this example, "Pablo's Burrito" can be signified by a restaurant mark with solid lines. In contrast, other restaurants from the search results 202 can be signified by a restaurant mark with dotted lines, no display at all, or the combination thereof.

The advertisement delivery system 100 can deliver and display the notification 802, and not generate and display the route 814. For example, the advertisement delivery system 100 can display the notification 802 for "Pablo's Burrito" on the display interface 802. The advertisement delivery system 100 cannot display the route 814 from the current location 302 to the destination 816 representing "Pablo's Burrito." The dotted line for the route 814 illustrates that the route 814 can be displayed or not displayed.

Referring now to FIG. 9, therein is shown a second example of the advertisement delivery system 100 delivering the notification 802 on the display interface 804 of the first device 102. In this example, the value of the relevancy priority 808 can be "10" while the values for the distance priority 806 and the customization priority 810 can be both "0." Subsequently, for this example, the advertisement delivery system 100 can prioritize the delivery of the notification 802 based on the exactness of the relative matches 208 of FIG. 2.

For a more specific example, the user can make an entry for the selection 204 representing "Chinese food" from the category of interest 206 representing "restaurant." The search results 202 can be the following restaurants: "Shogun Sushi," "Pablo's Burrito," and "Lin's Noodle." In this example, "Lin's Noodle" can be the exact match for the relative matches 208, as "Lin's Noodle" can be "Chinese food." In contrast, "Shogun Sushi" and "Pablo's Burrito" can be lesser degree of matching for the relative matches 208, as both restaurants may not be "Chinese food."

Continuing with the example, the advertisement delivery system 100 can deliver and display the notification 802 for "Lin's Noodle" on the display interface 804 based on the highest degree for the relative matches 208. The user can select the notification acceptance 812 to accept the notification 802 for "Lin's Noodle." Based on the acceptance, the advertisement delivery system 100 can generate the route 814 to reach "Lin's Noodle" from the current location 302. "Lin's Noodle" can represent the destination 816.

In contrast to FIG. 8, the advertisement delivery system 100 delivered the notification 802 and generated the route 814 to a restaurant further away from the current location 302 than the restaurant available in closer proximity from the current location 302. The restaurant with a closer proximity from the current location 302 is represented by a restaurant mark with dotted lines.

This contrast emphasizes the weight or the priority considered by the advertisement delivery system 100 for the values of the distance priority 806, the relevancy priority 808, and the customization priority 810. In this example, since the value of the relevancy priority 808 was higher than the values of the distance priority 806 and the customization priority 810, the advertisement delivery system 100 delivered the notification 802 for the search results 202 with the highest degree of the relative matches 208.

Figures 10, 11:
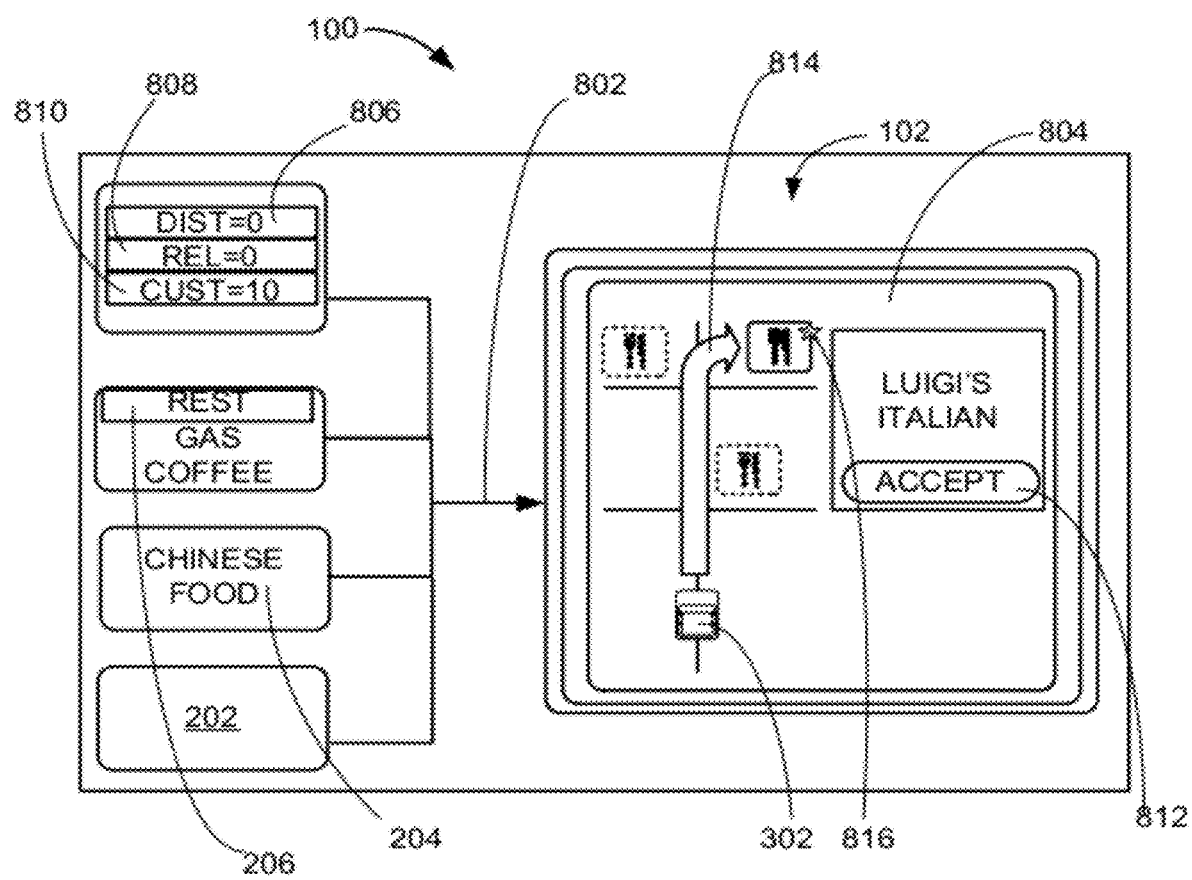
FIG. 10 shows a third example of the advertisement delivery system delivering the notification on the display interface of the first device.
FIG. 11 shows an example of an acceptance trend for accepting the notification.

Referring now to FIG. 10, therein is shown a third example of the advertisement delivery system 100 delivering the notification 802 on the display interface 804 of the first device 102. In this example, the value of the customization priority 810 can be "10" while the values for the distance priority 806 and the relevancy priority 808 can be both "0." Subsequently, for this example, the advertisement delivery system 100 can prioritize the delivery of the notification 802 based on the appraisal of the common attribute 402 of FIG. 4 shared by the search results 202.

For a more specific example, the user can make an entry for the selection 204 representing "Chinese food" from the category of interest 206 representing "restaurant." The search results 202 can be the following restaurants: "Shogun Sushi," "Pablo's Burrito," "Luigi's Italian," and "Lin's Noodle." In this example, the search results 202 can share the common attribute 402 for "rated" as described in FIG. 4. In another example, the search results 202 can share the common attribute 402 for "fee entity" as described in FIG. 4. For a further example, the restaurants can have the following rating, amount of fees paid, or the combination thereof: "Luigi's Italian=5 stars;" "Shogun Sushi=4 stars;" "Lin's Noodle=3 stars;" and "Pablo's Burrito=2 stars."

Continuing with the example, the advertisement delivery system 100 can deliver and display the notification 802 for "Luigi's Italian" on the display interface 804 based on the highest rating for the common attribute 402. The user can select the notification acceptance 812 to accept the notification for "Luigi's Italian." Based on the acceptance, the advertisement delivery system 100 can generate the route 814 to reach "Luigi's Italian" from the current location 302. "Luigi's Italian" can represent the destination 816.

In contrast to FIG. 8 and FIG. 9, the advertisement delivery system 100 delivered the notification 802 and generated the route 814 to a restaurant not only further away from the current location 302 than the restaurant available in closer proximity from the current location 302, but also to the restaurant with a lower degree of the relative matches 208. The restaurants with closer proximity from the current location 302 and the higher degree of the relative matches 208 are represented by restaurant marks with dotted lines. In this example, since the value of the customization priority 810 was higher than the values of the distance priority 806 and the relevancy priority 808, the advertisement delivery system 100 delivered the notification 802 for the search results 202 with the highest appraisal for the common attribute 402.

Referring now to FIG. 11, therein is shown an example of an acceptance trend 1102 for accepting the notification 802 of FIG. 8. The acceptance trend 1102 is defined as the pattern of the user accepting the notification 802 of FIG. 8 by selecting the notification acceptance 812 of FIG. 8 in a set time frame. The set time frame can be a definite or an indefinite time period.

The pattern can represent the acceptance of the notification 802 in the past, the acceptance of the notification 802 in the future, or the combination thereof. For example, the acceptance trend 1102 can represent the effective cost per mille (CPM). The effective CPM can be measured based on the historical click rates of the user selecting the notification acceptance 812 for the notification 802. For a specific example, the user can accept the notification 802 for "Chinese food" restaurants by selecting the notification acceptance 812 over ten times the past one week.

In FIG. 11, the left hand column can represent the types of restaurants for the category of interest 206. As a different example, the left hand column can represent the types of food selected by the user for the selection 204 of FIG. 2.

For a further example, the left hand column denoted as "FF," "CN," "JP," "IT," "MX," and "ST" can represent the restaurants for fast food, Chinese, Japanese, Italian, Mexican, and steak house respectively. The top row denoted as "10+," "5+," "3+," and "0+" can represent the frequency of the user accepting the notification 802 by selecting the notification acceptance 812.

For a specific example, the user had accepted the notification 802 over ten times in one week for restaurants representing "Chinese food." For a different example, the user had accepted the notification 802 over five times in one week for restaurants representing "Japanese food." For another example, the user had accepted the notification 802 zero time for restaurants representing "fast food."

As a different example, the advertisement delivery system 100 can extrapolate the acceptance trend 1102 for the notification 802. More specifically, by tracking the past records for the pattern for the notification acceptance 812, the advertisement delivery system 100 can extrapolate the acceptance trend 1102 for the notification 802 in the future. The details regarding the extrapolation will be discussed later.

Figure 12:
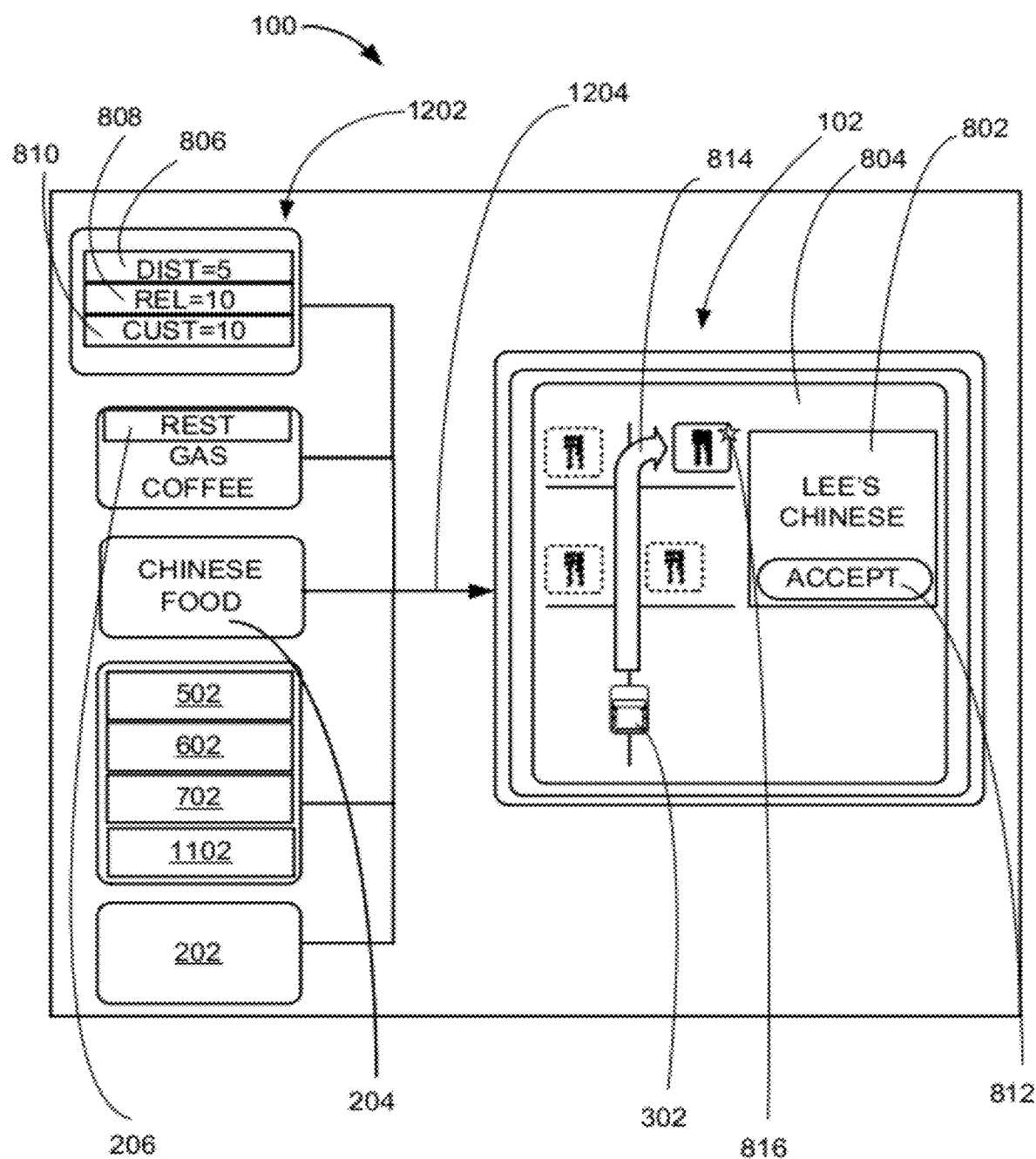
FIG. 12 shows a fourth example of the advertisement delivery system delivering the notification on the display interface of the first device.

Referring now to FIG. 12, therein is shown a fourth example of the advertisement delivery system 100 delivering the notification 802 on the display interface 804 of the first device 102. In this example, unlike FIG. 8, FIG. 9, or FIG. 10, the values for the distance priority 806, the relevancy priority 808, and the customization priority 810 are generated by a user's priority 1202.

The user's priority 1202 is defined as the user's preference for the advertisement delivery system 100 to deliver the notification 802. For a further definition, the user's priority 1202 signifies the factor or factors that the user finds important for the advertisement delivery system 100 to consider before delivering the notification 802. The user can include a user of the advertisement delivery system 100, an entity responsible for delivering the notification 802 to the user of the advertisement delivery system 100, or the combination thereof.

For example, rather than having the distance priority 806, the relevancy priority 808, the customization priority 810, or the combination thereof predefined by the advertisement delivery system 100, the advertisement delivery system 100 can generate the distance priority 806, the relevancy priority 808, the customization priority 810, or the combination thereof based on the user's priority 1202. As a specific example, the user's priority 1202 can define the distance priority 806 as "5," the relevancy priority 808 as "10," and the customization priority 810 as "10." Generating the distance priority 806, the relevancy priority 808, or the customization priority 810 based on the user's priority 1202 will be discussed later.

As a different example, the user can prefer to have the relative matches 208 of FIG. 2 between the selection 204 and the search results 202 as the most important factor. In this scenario, the user's priority 1202 can define the relevancy priority 808 to be "100" while the distance priority 806 and the customization priority 810 to be "1" for both to emphasize the importance of the exactness of the relative matches 208.

For another example, the selection 204 can be "Chinese food" from the category of interest 206 representing "restaurant." The search results 202 can be the following restaurants: "Shogun Sushi," "Pablo's Burrito," "Lee's Chinese," and "Lin's Noodle." The distances 304 of FIG. 3 can be the following in the order from the closest to the furthest from the current location 302: "Lin's Noodle=1 mile" "Pablo's Burrito=2 mile," "Shogun Sushi=4 miles," and "Lee's Chinese=8 miles." The relative matches 208 can be the following in the order from the high degree to the low degree for the relative matches 208: "Lin's Noodle," "Lee's Chinese," "Shogun Sushi," and "Pablo's Burrito."

The search results 202 can share the common attribute 402 of FIG. 4 for "rated" as described in FIG. 4. The common attribute 402 shared by the search results 202 can be represented as the following: "Lee's Chinese=5 stars;" "Shogun Sushi=4 stars;" "Lin's Noodle=3 stars;" and "Pablo's Burrito=2 stars."

The user's priority 1202 can represent the value of the distance priority 806, the relevancy priority 808, or the customization priority 810 as the following: the distance priority 806=5, the relevancy priority 808=10, and the customization priority 810=10. In this example, the user finds the relevancy priority 808 and the customization priority 810 as equally important over the distance priority 806 for the advertisement delivery system 100 to consider before delivering the notification 802.

As described in FIG. 8, FIG. 9, and FIG. 10 for factors considered by the advertisement delivery system 100 for delivering the notification 802, the advertisement delivery system 100 can also deliver the notification 802 based on the values from the location matrix 502, the relevancy matrix 602, the customization matrix 702, or the combination thereof. For example, the values for the location matrix 502 are illustrated in FIG. 5. The values for the relevancy matrix 602 are illustrated in FIG. 6. The values for the customization matrix 702 are illustrated in FIG. 7.

More specifically, the advertisement delivery system 100 can deliver the notification 802 based on an aggregation 1204 of the values from the distance priority 806, the relevancy priority 808, the customization priority 810, the location matrix 502, the relevancy matrix 602, the customization matrix 702, or the combination thereof. For a further example, the advertisement delivery system 100 can deliver the notification 802 based on the highest value for the aggregation 1204.

The aggregation 1204 is defined as the sum of the values from the distance priority 806, the relevancy priority 808, the customization priority 810, the location matrix 502, the relevancy matrix 602, the customization matrix 702, or the combination thereof. For example, the value from the distance priority 806 can be represented as "x;" the value from the location matrix 502 can be represented as "Loc;" the value from the relevancy priority 808 can be represented as "y;" the value from the relevancy matrix 602 can be represented as "Rel;" the value from the customization priority 810 can be represented as "z;" and the value from the customization matrix 702 can be represented as "Cust."

The formula for the aggregation 1204 is shown by equation 1 below:

$$\text{Aggregation}1204 = x(Loc) + y(Rel) + z(Cust) \quad (1)$$

The equation represents the calculation for the aggregation 1204. The aggregation 1204 for "Lee's Chinese" can be calculated according to the following. For a specific example, the value for "Loc" for "Lee's Chinese" based on the location matrix 502 can be "1." The value for "Rel" based on the relevancy matrix 602 can be "10." The value for "Cust" based on the customization matrix 702 can be "50." The aggregation 1204 for "Lee's Chinese" can be (5)(1)+(10)(10)+(10)(50)=605.

As a different example, the aggregation 1204 for "Lin's Noodle" can be calculated according to the following. For a specific example, the value for "Loc" for "Lin's Noodle" based on the location matrix 502 can be "10." The value for "Rel" based on the relevancy matrix 602 can be "10." The value for "Cust" based on the customization matrix 702 can be "10." The aggregation 1204 for "Lin's Noodle" can be 5(10)+(10)(10)+(10)(10)=250.

As another example, the aggregation 1204 for "Shogun Sushi" can be calculated according to the following. For a specific example, the value for "Loc" for "Shogun Sushi" based on the location matrix 502 can be "7." The value for "Rel" based on the relevancy matrix 602 can be "9." The value for "Cust" based on the customization matrix 702 can be "25." The aggregation 1204 for "Shogun Sushi" can be 5(7)+(10)(9)+(10)(25)=375.

For another example, the aggregation 1204 for "Pablo's Burrito" can be calculated according to the following. For a specific example, the value for "Loc" for "Pablo's Burrito" based on the location matrix 502 can be "3." The value for "Rel" based on the relevancy matrix 602 can be "2." The value for "Cust" based on the customization matrix 702 can be "5." The aggregation 1204 for "Pablo's Burrito" can be (5)(3)+(10)(2)+(10)(5)=85.

Based on the value of the aggregation 1204 for "Lee's Chinese," "Lin's Noodle," "Shogun Sushi," and "Pablo's Burrito," the advertisement delivery system 100 can deliver the notification 802 for "Lee's Chinese" to be displayed on the display interface 804. The user can accept the notification 802 by selecting the notification acceptance 812. Based on the acceptance, the advertisement delivery system 100 can generate the route 814 to reach the destination 816 representing "Lee's Chinese."

Figure 13:
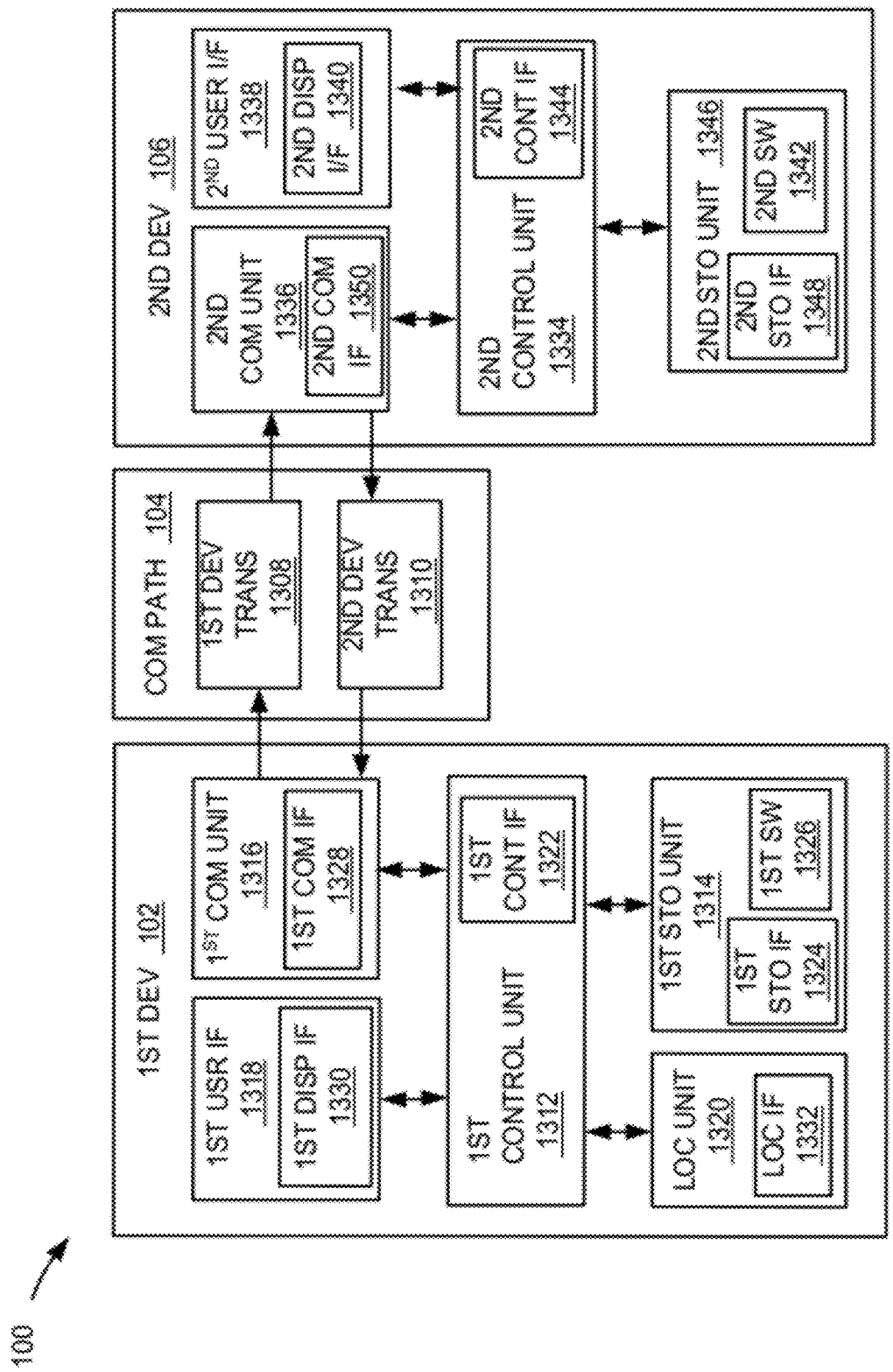
FIG. 13 shows an exemplary block diagram of the advertisement delivery system.

Referring now to FIG. 13, therein is shown an exemplary block diagram of the advertisement delivery system 100. The advertisement delivery system 100 can include the first device 102, the communication path 104, and the second device 106. The first device 102 can send information in a first device transmission 1308 over the communication path 104 to the second device 106. The second device 106 can send information in a second device transmission 1310 over the communication path 104 to the first device 102.

For illustrative purposes, the advertisement delivery system 100 is shown with the first device 102 as a client device, although it is understood that the advertisement delivery system 100 can have the first device 102 as a different type of device. For example, the first device 102 can be a server.

Also for illustrative purposes, the advertisement delivery system 100 is shown with the second device 106 as a server, although it is understood that the advertisement delivery system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 1312, a first storage unit 1314, a first communication unit 1316, a first user interface 1318, and a location unit 1320. The first device 102 can be similarly described by the first device 102.

The first control unit 1312 can include a first control interface 1322. The first control unit 1312 can execute a first software 1326 to provide the intelligence of the advertisement delivery system 100. The first control unit 1312 can be implemented in a number of different manners. For example, the first control unit 1312 can be a processor, an embedded processor, a microprocessor, a hardware control logic, a hardware finite state machine (FSM), a digital signal processor (DSP), or a combination thereof. The first control interface 1322 can be used for communication between the first control unit 1312 and other functional units in the first device 102. The first control interface 1322 can also be used for communication that is external to the first device 102.

The first control interface 1322 can receive information from the other functional units or from external sources, or can transmit information to the other functional units or to external destinations. The external sources and the external destinations refer to sources and destinations external to the first device 102.

The first control interface 1322 can be implemented in different ways and can include different implementations depending on which functional units or external units are being interfaced with the first control interface 1322. For example, the first control interface 1322 can be implemented with a pressure sensor, an inertial sensor, a microelectromechanical system (MEMS), optical circuitry, waveguides, wireless circuitry, wireline circuitry, or a combination thereof.

The location unit 1320 can generate location information, current heading, and current speed of the first device 102, as examples. The location unit 1320 can be implemented in many ways. For example, the location unit 1320 can function as at least a part of a global positioning system (GPS), an inertial navigation system, a cellular-tower location system, a pressure location system, or any combination thereof.

The location unit 1320 can include a location interface 1332. The location interface 1332 can be used for communication between the location unit 1320 and other functional units in the first device 102. The location interface 1332 can also be used for communication that is external to the first device 102.

The location interface 1332 can receive information from the other functional units or from external sources, or can transmit information to the other functional units or to external destinations. The external sources and the external destinations refer to sources and destinations external to the first device 102.

The location interface 1332 can include different implementations depending on which functional units or external units are being interfaced with the location unit 1320. The location interface 1332 can be implemented with technologies and techniques similar to the implementation of the first control interface 1322.

The first storage unit 1314 can store the first software 1326. The first storage unit 1314 can also store the relevant information, such as advertisements, points of interest (POI), navigation routing entries, or any combination thereof.

The first storage unit 1314 can be a volatile memory, a nonvolatile memory, an internal memory, an external memory, or a combination thereof. For example, the first storage unit 1314 can be a nonvolatile storage such as non-volatile random access memory (NVRAM), Flash memory, disk storage, or a volatile storage such as static random access memory (SRAM).

The first storage unit 1314 can include a first storage interface 1324. The first storage interface 1324 can be used for communication between the location unit 1320 and other functional units in the first device 102. The first storage interface 1324 can also be used for communication that is external to the first device 102.

The first storage interface 1324 can receive information from the other functional units or from external sources, or can transmit information to the other functional units or to external destinations. The external sources and the external destinations refer to sources and destinations external to the first device 102.

The first storage interface 1324 can include different implementations depending on which functional units or external units are being interfaced with the first storage unit 1314. The first storage interface 1324 can be implemented with technologies and techniques similar to the implementation of the first control interface 1322.

The first communication unit 1316 can enable external communication to and from the first device 102. For example, the first communication unit 1316 can permit the first device 102 to communicate with the second device 106 of FIG. 1, an attachment, such as a peripheral device or a computer desktop, and the communication path 104.

The first communication unit 1316 can also function as a communication hub allowing the first device 102 to function as part of the communication path 104 and not limited to be an end point or terminal unit to the communication path 104. The first communication unit 1316 can include active and passive components, such as microelectronics or an antenna, for interaction with the communication path 104.

The first communication unit 1316 can include a first communication interface 1328. The first communication interface 1328 can be used for communication between the first communication unit 1316 and other functional units in the first device 102. The first communication interface 1328 can receive information from the other functional units or can transmit information to the other functional units.

The first communication interface 1328 can include different implementations depending on which functional units are being interfaced with the first communication unit 1316. The first communication interface 1328 can be implemented with technologies and techniques similar to the implementation of the first control interface 1322.

The first user interface 1318 allows a user (not shown) to interface and interact with the first device 102. The first user interface 1318 can include an input device and an output device. Examples of the input device of the first user interface 1318 can include a keypad, a touchpad, soft-keys, a keyboard, a microphone, or any combination thereof to provide data and communication inputs.

The first user interface 1318 can include a first display interface 1330. Examples of the first display interface 1330 can include the display interface 804 of FIG. 8. The first display interface 1330 can include a display, a projector, a video screen, a speaker, or any combination thereof. The screen shot shown on the display interface 804 described in FIG. 8 can represent the screen shot for the advertisement delivery system 100.

The first control unit 1312 can operate the first user interface 1318 to display information generated by the advertisement delivery system 100. The first control unit 1312 can also execute the first software 1326 for the other functions of the advertisement delivery system 100, including receiving location information from the location unit 1320. The first control unit 1312 can further execute the first software 1326 for interaction with the communication path 104 via the first communication unit 1316.

The second device 106 can be optimized for implementing the present invention in a multiple device embodiment with the first device 102. The second device 106 can provide the additional or higher performance processing power compared to the first device 102. The second device 106 can include a second control unit 1334, a second communication unit 1336, and a second user interface 1338.

The second user interface 1338 allows a user (not shown) to interface and interact with the second device 106. The second user interface 1338 can include an input device and an output device. Examples of the input device of the second user interface 1338 can include a keypad, a touchpad, soft-keys, a keyboard, a microphone, or any combination thereof to provide data and communication inputs. Examples of the output device of the second user interface 1338 can include a second display interface 1340. The second display interface 1340 can include a display, a projector, a video screen, a speaker, or any combination thereof.

The second control unit 1334 can execute a second software 1342 to provide the intelligence of the second device 106 of the advertisement delivery system 100. The second software 1342 can operate in conjunction with the first software 1326. The second control unit 1334 can provide additional performance compared to the first control unit 1312.

The second control unit 1334 can operate the second user interface 1338 to display information. The second control unit 1334 can also execute the second software 1342 for the other functions of the advertisement delivery system 100, including operating the second communication unit 1336 to communicate with the first device 102 over the communication path 104.

The second control unit 1334 can be implemented in a number of different manners. For example, the second control unit 1334 can be a processor, an embedded processor, a microprocessor, a hardware control logic, a hardware finite state machine (FSM), a digital signal processor (DSP), or a combination thereof.

The second control unit 1334 can include a second controller interface 1344. The second controller interface 1344 can be used for communication between the second control unit 1334 and other functional units in the second device 106. The second controller interface 1344 can also be used for communication that is external to the second device 106.

The second controller interface 1344 can receive information from the other functional units or from external sources, or can transmit information to the other functional units or to external destinations. The external sources and the external destinations refer to sources and destinations external to the second device 106.

The second controller interface 1344 can be implemented in different ways and can include different implementations depending on which functional units or external units are being interfaced with the second controller interface 1344. For example, the second controller interface 1344 can be implemented with a pressure sensor, an inertial sensor, a microelectromechanical system (MEMS), optical circuitry, waveguides, wireless circuitry, wireline circuitry, or a combination thereof.

A second storage unit 1346 can store the second software 1342. The second storage unit 1346 can also store the relevant information, such as advertisements, points of interest (POI), navigation routing entries, or any combination thereof. The second storage unit 1346 can be sized to provide the additional storage capacity to supplement the first storage unit 1314.

For illustrative purposes, the second storage unit 1346 is shown as a single element, although it is understood that the second storage unit 1346 can be a distribution of storage elements. Also for illustrative purposes, the advertisement delivery system 100 is shown with the second storage unit 1346 as a single hierarchy storage system, although it is understood that the advertisement delivery system 100 can have the second storage unit 1346 in a different configuration. For example, the second storage unit 1346 can be formed with different storage technologies forming a memory hierarchal system including different levels of caching, main memory, rotating media, or off-line storage.

The second storage unit 1346 can be a volatile memory, a nonvolatile memory, an internal memory, an external memory, or a combination thereof. For example, the second storage unit 1346 can be a nonvolatile storage such as non-volatile random access memory (NVRAM), Flash memory, disk storage, or a volatile storage such as static random access memory (SRAM).

The second storage unit 1346 can include a second storage interface 1348. The second storage interface 1348 can be used for communication between the location unit 1320 and other functional units in the second device 106. The second storage interface 1348 can also be used for communication that is external to the second device 106.

The second storage interface 1348 can receive information from the other functional units or from external sources, or can transmit information to the other functional units or to external destinations. The external sources and the external destinations refer to sources and destinations external to the second device 106.

The second storage interface 1348 can include different implementations depending on which functional units or external units are being interfaced with the second storage unit 1346. The second storage interface 1348 can be implemented with technologies and techniques similar to the implementation of the second controller interface 1344.

The second communication unit 1336 can enable external communication to and from the second device 106. For example, the second communication unit 1336 can permit the second device 106 to communicate with the first device 102 over the communication path 104.

The second communication unit 1336 can also function as a communication hub allowing the second device 106 to function as part of the communication path 104 and not limited to be an end point or terminal unit to the communication path 104. The second communication unit 1336 can include active and passive components, such as microelectronics or an antenna, for interaction with the communication path 104.

The second communication unit 1336 can include a second communication interface 1350. The second communication interface 1350 can be used for communication between the second communication unit 1336 and other functional units in the second device 106. The second communication interface 1350 can receive information from the other functional units or can transmit information to the other functional units.

The second communication interface 1350 can include different implementations depending on which functional units are being interfaced with the second communication unit 1336. The second communication interface 1350 can be implemented with technologies and techniques similar to the implementation of the second controller interface 1344.

The first communication unit 1316 can couple with the communication path 104 to send information to the second device 106 in the first device transmission 1308. The second device 106 can receive information in the second communication unit 1336 from the first device transmission 1308 of the communication path 104.

The second communication unit 1336 can couple with the communication path 104 to send information to the first device 102 in the second device transmission 1310. The first device 102 can receive information in the first communication unit 1316 from the second device transmission 1310 of the communication path 104. The advertisement delivery system 100 can be executed by the first control unit 1312, the second control unit 1334, or a combination thereof.

For illustrative purposes, the second device 106 is shown with the partition having the second user interface 1338, the second storage unit 1346, the second control unit 1334, and the second communication unit 1336, although it is understood that the second device 106 can have a different partition. For example, the second software 1342 can be partitioned differently such that some or all of its function can be in the second control unit 1334 and the second communication unit 1336. Also, the second device 106 can include other functional units not shown in FIG. 13 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the advertisement delivery system 100 is described by operation of the first device 102 and the second device 106. It is understood that the first device 102 and the second device 106 can operate any of the modules and functions of the advertisement delivery system 100. For example, the first device 102 is described to operate the location unit 1320, although it is understood that the second device 106 can also operate the location unit 1320.

Figure 14:
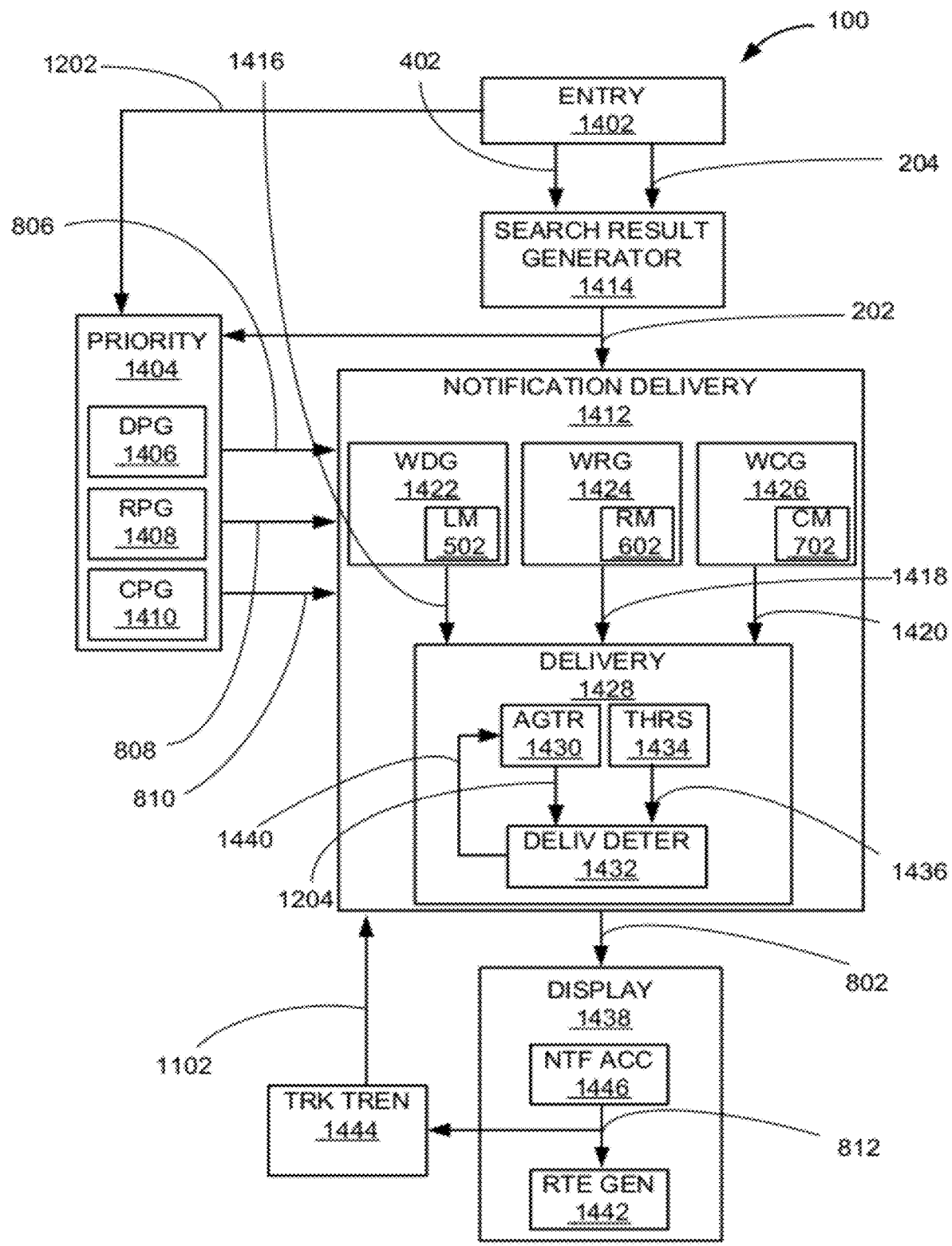
FIG. 14 shows a control flow of the advertisement delivery system.

Referring now to FIG. 14, therein is shown a control flow of the advertisement delivery system 100. The advertisement delivery system 100 can include an entry module 1402. The entry module 1402 receives the entry from the user. For example, the entry module 1402 can receive the selection 204 for the category of interest 206 of FIG. 2.

As a specific example, the entry module 1402 can receive the selection 204 for "Chinese food" for the category of interest 206 representing "restaurant." The entry module 1402 can send the selection 204 to a search result generator module 1414.

The advertisement delivery system 100 can include the search result generator module 1414. The search result generator module 1414 generates point of interest results based on the user's entry. For example, the search result generator module 1414 can generate the search results 202 for the selection 204, the search results 202 based on the current location 302 of FIG. 3 for locating the device 102 of FIG. 1 providing the selection 204.

The search result generator module 1414 can generate the search results 202 in a number of ways. For example, the search result generator module 1414 can store a list of point of interests for the category of interest 206 representing "restaurant." The point of interests can be preinstalled into the search result generator module 1414 from a data file, such as a Compact Disc (CD) or Digital Versatile Disc (DVD). As a different example, the search result generator module 1414 can obtain the list of point interests from external sources, such as Yelp.com™, through the first control interface 1322 of FIG. 13. The search result generator module 1414 can store other types of point of interests, such as lists of coffee shops, car dealers, and dry cleaners. More specifically for the point of interests for restaurant, the list can include restaurants for all types of cuisines.

Continuing with the example, the point of interests for the restaurant can be categorized in a number of ways. Each point of interests can have number of characteristics. For example, the characteristics can include the address, the type of cuisine, or the combination thereof. The point of interests for the restaurants can be categorized by, for example, the type of cuisines.

For a more specific example, the selection 204 can be "Chinese food" from the category of interest 206 representing "restaurant." The search result generator module 1414 can query and extract restaurants pertaining to "Chinese food" from the point of interests that includes all types of cuisines to generate the search results 202 representing restaurants for "Chinese food."

The search result generator module 1414 can limit the generation of the search results 202 based on the distances 304 from the current location 302. For example, the limitation can be predefined at 10 miles radius for the distances 304 from the current location 302.

As a different example, the search results 202 can represent all types of cuisines rather than specifically for "Chinese food." Continuing from the previous example, the selection 204 can be "Chinese food." The search result generator module 1414 can generate the search results 202 for all types of cuisines based on the selection 204 for "Chinese food."

As another example, the entry for the selection 204 can be a partial entry. For example, instead of the user entering "Chinese food" for the selection 204, the manual entry can be just "Chinese." In this scenario, the search result generator module 1414 can query and extract results pertaining to "Chinese" from a list of point of interests stored in the search result generator module 1414. The search results 202 can include not only "Chinese food," but also "Chinese grocery stores." The search result generator module 1414 can send the search results 202 to a notification delivery module 1412.

For illustrative purposes, the advertisement delivery system 100 is described with the entry module 1402 receiving the selection 204, although it is understood that the advertisement delivery system 100 can operate the entry module 1402 differently. For example, the entry module 1402 can receive the user's priority 1202 as part of the user's entry.

The entry module 1402 can receive the user's priority 1202 in a number of ways. For example, the entry module 1402 can receive the user's priority 1202 as a manually typed entry, a choice from a list, a voice entry, or the combination thereof. As a specific example, the user can manually type the value for the distance priority 806 as "5," the relevancy priority 808 as "10," and the customization priority 810 as "10" into the entry module 1402. As a different example, the user can make a voice entry by stating that the value of the distance priority 806 is "5," the relevancy priority 808 is "10," and the customization priority 810 is "10." The entry module 1402 can send the user's priority 1202 to a priority module 1404.

The advertisement delivery system 100 can include the priority module 1404. The priority module 1404 generates the factors that provide prioritization for the delivery of the notification 802. For example, the priority module 1404 can generate the distance priority 806, the relevancy priority 808, the customization priority 810, or the combination thereof.

The priority module 1404 can generate the distance priority 806, the relevancy priority 808, or the customization priority 810 in a number of ways. For example, the priority module 1404 can include a distance priority generator module 1406. The distance priority generator module 1406 generates factors that prioritizes the delivery of the notification 802 based on the distances 304 of FIG. 3. For example, the distance priority generator module 1406 can generate the distance priority 806.

The distance priority generator module 1406 can generate the distance priority 806 in a number of ways. For example, the distance priority generator module 1406 can initially be populated by preloading the data, by user manually entering the data as the user's priority 1202, or the combination thereof. For a further example, the manufacturer, the user, or the combination thereof can upload a data file, such as a CD or DVD, into the distance priority generator module 1406.

The data file can include the values of the distance priority 806. The values can include numerical values, alphabetical values, or the combination thereof as described in FIG. 8. For a specific example, the data file can predefine the value of the distance priority 806 to be "5." For a different example, the user's priority 1202 can define the value of the distance priority 806 to be "7." Based on the data file, the user's priority, or the combination thereof, the distance priority generator module 1406 can generate the distance priority 806.

The distance priority generator module 1406 can generate the distance priority 806 based on the search results 202. As previously discussed, the search results 202 can be limited to point of interests within the predefined radius of 10 miles for the distances 304 from the current location 302.

For example, the category of interest 206 can be "restaurant." The user can operate the vehicle in a remote geographic region where the choices for restaurants are limited. If the number of available restaurants in the predefined radius, for example, is less than five, the distance priority generator module 1406 can generate the distance priority 806 with the highest value. Furthermore, if the highest value is "10," the distance priority generator module 1406 can generate the distance priority 806 to be "10."

Continuing with the example, the distance priority generator module 1406 can set the highest value for the distance priority 806 to prioritize the delivery of the notification 802 based on the nearness of the distances 304. For a further example, in a remote geographic region, the exactness of the relative matches 208 can be less important, as the user can prefer a restaurant that is closest from the current location 302 when the choices are limited.

The distance priority generator module 1406 can increase or decrease the distance priority 806. For example, the distance priority generator module 1406 can adjust the distance priority 806.

The distance priority generator module 1406 can adjust the distance priority 806 in a number of ways. For example, the predefined value of the distance priority 806 can be increased from "5" to "10" in the data file. As a different example, the user's priority 1202 can increase the distance priority 806 from "7" by the user manually entering "10."

For another example, the distance priority generator module 1406 can adjust the distance priority 806 based on the search results 202. As a specific example, in contrast to the user operating the vehicle in a remote geographic region, the user can operate the vehicle in an urban geographic area where choices for restaurants are abundant. The distance priority generator module 1406 can adjust the distance priority 806 by decreasing the value for the distance priority 806 to reduce priority for delivering the notification 802 based on the nearness of the distances 304. In this scenario, the relevancy priority 808 can be increased, as the distances 304 can be less important while the exactness of the relative matches 208 can be more important. The details regarding the relevancy priority 808 will be discussed later.

The priority module 1404 can include a relevancy priority generator module 1408. The relevancy priority generator module 1408 generates factors that prioritizes the delivery of the notification 802 based on the relative matches 208 of FIG. 2. For example, the relevancy priority generator module 1408 can generate the relevancy priority 808.

The relevancy priority generator module 1408 can generate the relevancy priority 808 in a number of ways. For example, the relevancy priority generator module 1408 can initially be populated by preloading the data, by user manually entering the data as the user's priority 1202, or the combination thereof. For a further example, the manufacturer, the user, or the combination thereof can upload a data file, such as a CD or DVD, into the relevancy priority generator module 1408.

The data file can include the values of the relevancy priority 808. The values can include numerical values, alphabetical values, or the combination thereof as described in FIG. 8. For a specific example, the data file can predefine the value of the relevancy priority 808 to be "10." For a different example, the user's priority 1202 can define the value of the relevancy priority 808 to be "8." Based on the data file, the user's priority 1202, or the combination thereof, the relevancy priority generator module 1408 can generate the relevancy priority 808.

The relevancy priority generator module 1408 can generate the relevancy priority 808 based on the search results 202. Continuing with the previous example, the search results 202 can be limited to point of interests within the predefined radius of 10 miles for the distances 304 from the current location 302.

For example, the category of interest 206 can be "restaurant." The user can operate the vehicle in an urban geographic region where the choices for restaurants are abundant. If the number of available restaurants in the predefined radius, for example, is greater than 20, the relevancy priority generator module 1408 can generate the relevancy priority 808 as "10," with "10" being the highest value.

Continuing with the example, the relevancy priority generator module 1408 can set the highest value for the relevancy priority 808 to prioritize the delivery of the notification 802 based on the exactness of the relative matches 208. For a further example, in an urban geographic region, the nearness of the distances 304 can be less important, as the user can prefer the exactness of the relative matches 208 when there are many restaurants to choose from.

The relevancy priority generator module 1408 can increase or decrease the relevancy priority 808. For example, the relevancy priority generator module 1408 can adjust the relevancy priority 808.

The distance priority generator module 1406 can adjust the relevancy priority 808 in a number of ways. For example, the predefined value of the relevancy priority 808 can be decreased from "10" to "6" in the data file. As a different example, the user's priority 1202 can increase the relevancy priority 808 from "8" by the user manually entering "10."

For another example, the relevancy priority generator module 1408 can adjust the relevancy priority 808 based on the search results 202. As a specific example, in contrast to the user operating the vehicle in an urban geographic region, the user can operate the vehicle in a remote geographic area where choices for restaurants are limited. The relevancy priority generator module 1408 can adjust the relevancy priority 808 by decreasing the value for the relevancy priority 808 to reduce priority for delivering the notification 802 based on the exactness of the relative matches 208, because the user can prefer a restaurant that is closest to the current location 302.

The priority module 1404 can include a customization priority generator module 1410. The customization priority generator module 1410 generates factors that prioritizes the delivery of the notification 802 based on the common attribute 402 of FIG. 4. For example, the customization priority generator module 1410 can generate the customization priority 810.

The customization priority generator module 1410 can generate the customization priority 810 in a number of ways. For example, the customization priority generator module 1410 can initially be populated by preloading the data, by user manually entering the data as the user's priority 1202, or the combination thereof. For a further example, the manufacturer, the user, or the combination thereof can upload a data file, such as a CD or DVD, into the customization priority generator module 1410.

The data file can include the values of the customization priority 810. The values can include numerical values, alphabetical values, or the combination thereof as described in FIG. 8. For a specific example, the data file can predefine the value of the customization priority 810 to be "10." For a different example, the user's priority 1202 can define the value of the customization priority 810 to be "2." Based on the data file, the user's priority 1202, or the combination thereof, the customization priority generator module 1410 can generate the customization priority 810.

The customization priority generator module 1410 can generate the customization priority 810 for monetization purposes. For example, an entity responsible for delivering the notification 802 can desire to prioritize the delivery of the notification 802 based on the amount of fees paid for the "fee entity."

For a specific example, the category of interest 206 can be "restaurant." The restaurants can share "fee entity" as the common attribute 402 of FIG. 4. The restaurants can pay advertisement fee to the entity. In exchange, the entity can prioritize the delivery of the notification 802 for the restaurants that paid fees. The entity can prioritize the delivery of the notification 802 based on "fee entity" by defining the value of the customization priority 810 to "10," with "10" being the highest value.

As a different example, the customization priority generator module 1410 can generate the customization priority 810 based on the time, day, date, or the combination thereof. For example, the customization priority generator module 1410 can include a calendar. The category of interest 206 can be "restaurant." The restaurants can share "happy hour special deals" as the common attribute 402. The restaurants can have happy hour drink specials starting from 4 PM on Fridays. To prioritize the delivery of the notification 802 for restaurants with "happy hour special deals" as the common attribute 402, the customization priority generator module 1410 can generate the customization priority 810 as "10," with "10" being the highest value starting on Thursdays.

The customization priority generator module 1410 can increase or decrease the customization priority 810. For example, the customization priority generator module 1410 can adjust the customization priority 810.

The customization priority generator module 1410 can adjust the customization priority 810 in a number of ways. For example, the predefined value of the customization priority 810 can be decreased from "10" to "2" in the data file. As a different example, the user's priority 1202 can increase the customization priority 810 from "2" by the user manually entering "10." For another example, the customization priority generator module 1410 can decrease the customization priority 810 on certain days. More specifically, the customization priority generator module 1410 can decrease the customization priority 810 after a Friday when the happy hour drink special is over.

The priority module 1404 can send the distance priority 806, the relevancy priority 808, the customization priority 810, or the combination thereof to the notification delivery module 1412.

The advertisement delivery system 100 can include the notification delivery module 1412. The notification delivery module 1412 delivers a visual message, audio message, or the combination thereof to the user. For example, the notification delivery module 1412 can deliver the notification 802 from the search results 202 by the aggregation 1204 of a weighted distance 1416, a weighted relevancy 1418, and a weighted customization 1420 if the aggregation 1204 met or exceeded a threshold 1436. The details regarding the weighted distance 1416, the weighted relevancy 1418, the weighted customization 1420, and the threshold 1436 will be discussed later.

The notification delivery module 1412 can deliver the notification 802 in a number of ways. For example, the notification delivery module 1412 can include a weighted distance generator module 1422. The weighted distance generator module 1422 generates the product of the factors between the relative proximity between each possible interest to the user's geographic location and the priority placed on considering that relative proximity. For a further definition, the weighted distance generator module 1422 prioritizes the factors that represent the relative proximity over other factors. The other factors can include the exactness of the relative matches 208 and the type of characteristics shared amongst the search results 202. For a further example, the weighted distance generator module 1422 can prioritize the distances 304 over the relative matches 208, the common attribute 402, or the combination thereof.

The weighted distance generator module 1422 can generate the weighted distance 1416 based on the distances 304 of the search results 202 from the current location 302. The weighted distance 1416 is defined as the product from multiplying the value of the distance priority 806 and the value from the location matrix 502 or "x(Loc)" as described in FIG. 12.

The weighted distance generator module 1422 can generate the weighted distance 1416 in a number of ways. For example, the weighted distance generator module 1422 can include the location matrix 502. Sample values for the location matrix 502 are as illustrated in FIG. 5. As described in FIG. 12, one of the search results 202 can be "Lee's Chinese." "Lee's Chinese" can be 8 miles from the current location 302. As described in FIG. 5, based on the 8 miles, the weighted distance generator module 1422 can assign the value from the location matrix 502 as "1" for "Lee's Chinese."

As described earlier, the distance priority 806 can be predefined by the distance priority generator module 1406, by the user's priority 1202, or the combination thereof as "5." Based on the distance priority 806 and the value from the location matrix 502 for "Lee's Chinese," the weighted distance generator module 1422 can generate the weighted distance 1416 to be the product "(1)(5)." For this example, the weighted distance 1416 can be "5." As another example, the weighted distance 1416 can be the product of the distance priority 806 generated by the distance priority generator module 1406 based on the search results 202 and the value from the location matrix 502.

The weighted distance generator module 1422 can generate the weighted distance 1416 for each of the search results 202. The weighted distance generator module 1422 can send each of the weighted distance 1416 to a delivery module 1428.

The notification delivery module 1412 can include a weighted relevancy generator module 1424. The weighted relevancy generator module 1424 generates the product of the factors between the degree or level of pertinence of the search results 202 to the selection 204 and the priority placed on considering that degree or level of pertinence. For a further definition, the weighted relevancy generator module 1424 prioritizes the factor for the degree or level of pertinence over other factors. The other factors can include the relative proximity of the possible interests to the current location 302 and the type of characteristics shared amongst the search results 202. For a further example, the weighted relevancy generator module 1424 can prioritize the relative matches 208 over the distances 304, the common attribute 402, or a combination thereof.

The weighted relevancy generator module 1424 can generate the weighted relevancy 1418 based on the relative matches 208 of the search results 202 and the selection 204. The weighted relevancy 1418 is defined as the product from multiplying the value of the relevancy priority 808 and the value from the relevancy matrix 602 or "y(Rel)" as described in FIG. 12.

The weighted relevancy generator module 1424 can generate the weighted relevancy 1418 in a number of ways. For example, the weighted relevancy generator module 1424 can include the relevancy matrix 602. Sample values for the relevancy matrix 602 are as illustrated in FIG. 6.

For a specific example, the selection 204 can be for "Chinese food." As described in FIG. 12, one of the search results 202 can be "Lee's Chinese." As discussed earlier, each of the search results 202 can contain characteristics representing the type of cuisine. "Lee's Chinese" can be categorized under a type of cuisine that represents "Chinese food." Subsequently, the relative matches 208 between the selection 204 and the search results 202 can be an exact match. As described in FIG. 6, based on the relative matches 208, the weighted relevancy generator module 1424 can assign the value from the relevancy matrix 602 as "10" for "Lee's Chinese."

As described earlier, the relevancy priority 808 can be predefined by the relevancy priority generator module 1408, by the user's priority 1202, or the combination thereof as "10." Based on the relevancy priority 808 and the value from the relevancy matrix 602 for "Lee's Chinese," the weighted relevancy generator module 1424 can generate the weighted relevancy 1418 to be the product "(10)(10)." For this example, the weighted relevancy 1418 can be "100." As another example, the weighted relevancy 1418 can be the product of the relevancy priority 808 generated by the relevancy priority generator module 1408 based on the search results 202 and the value from the relevancy matrix 602.

The weighted relevancy generator module 1424 can generate the weighted relevancy 1418 for each of the search results 202. The weighted relevancy generator module 1424 can send each of the weighted relevancy 1418 to the delivery module 1428.

The notification delivery module 1412 can include a weighted customization generator module 1426. The weighted customization generator module 1426 generates the product of the factors between the properties or characteristics shared amongst the search results 202 and the priority placed on considering that shared properties or characteristics. For a further definition, the weighted customization generator module 1426 prioritizes the factor for the shared properties or characteristics over other factors. The other factors can include the exactness of the relative matches 208 and the relative proximity of the possible interests to the current location 302. For a further example, the weighted customization generator module 1426 can prioritize the common attribute 402 shared by the search results 202 over the distances 304, the relative matches 208, or the combination thereof.

The weighted customization generator module 1426 can generate the weighted customization 1420 with the search results 202 sharing the common attribute 402 that is predefined. The weighted customization 1420 is defined as the product from multiplying the value of the customization priority 810 and the value from the customization matrix 702 of FIG. 7 or "z(Cust)" as described in FIG. 12.

The weighted customization generator module 1426 can generate the weighted customization 1420 in a number of ways. For example, the weighted customization generator module 1426, the user, or the combination thereof can select the common attribute 402 out of the multiple predefined attributes 404 of FIG. 4.

For a specific example, the manufacturer, the user, or the combination thereof can upload a data file, such as a CD or DVD, into the weighted customization generator module 1426. The data file can include the multiple predefined attributes 404 where the choices for the common attribute 402 can be selected from. The choice can be "fee entity." The weighted customization generator module 1426 can select the "fee entity" as the common attribute 402.

Continuing with the example, the weighted customization generator module 1426 can receive the search results 202 from the search result generator module 1414. Some of the search results 202 can share the common attribute 402. The weighted customization generator module 1426 can extract the search results 202 having the common attribute 402 representing "fee entity" from the search results 202 without the common attribute 402.

As a different example, the user can enter the choice for the common attribute 402 directly into the entry module 1402. The entry module 1402 can have the data file that lists the multiple predefined attributes 404 to choose the common attribute 402 from. The data file can be uploaded from a CD or DVD into the entry module 1402.

The entry module 1402 can receive the choice for the common attribute 402 as a manually typed entry, a choice from a list representing the multiple predefined attributes 404, a voice entry, or the combination thereof. The choice made by the user can be "rated" as the common attribute 402.

Continuing with the example for the user entering the choice for the common attribute 402, the search result generator module 1414 can generate the search results 202 having the common attribute 402 representing "rated." As discussed previously, the search result generator module 1414 can store a list having number of characteristics. And one of the characteristics can be having been "rated." The search result generator module 1414 can query and extract the search results 202 with the common attribute 402 representing "rated."

The weighted customization 1420 can represent the product of the multiplication of two factors. As defined earlier, the weighted customization 1420 can represent the product from multiplying the value of the customization priority 810 and the value from the customization matrix 702 or "z(Cust)".

For a further example, the weighted customization generator module 1426 can include the customization matrix 702. Sample values for the customization matrix 702 are as illustrated in FIG. 7. Continuing from the previous examples, the selection 204 can be "Chinese food" and one of the search results 202 can be "Lee's Chinese." The common attribute 402 can be "rated." "Lee's Chinese" can be rated "5 stars" for the common attribute 402. As described in FIG. 7, based on the "5 stars" rating, the weighted customization generator module 1426 can assign the value from the customization matrix 702 as "50" for "Lee's Chinese."

As described earlier, the customization priority 810 can be predefined by the customization priority generator module 1410, by the user's priority 1202, or the combination thereof as "10." Based on the customization priority 810 and the value from the customization matrix 702 for "Lee's Chinese," the weighted customization generator module 1426 can generate the weighted customization 1420 to be the product of "(10)(50)." For this example, the weighted customization 1420 can be "500." As another example, the weighted customization 1420 can be the product of the customization priority 810 generated by the customization priority generator module 1410 based on the time, day, date or the combination thereof and value from the customization matrix 702.

The weighted customization generator module 1426 can generate the weighted customization 1420 for each of the search results 202 having the common attribute 402. The weighted customization generator module 1426 can send each of the weighted customization 1420 to the delivery module 1428.

The advertisement delivery system 100 can include the delivery module 1428. The delivery module 1428 determines which message will be delivered to the user. The delivery module 1428 delivers the notification 802 from the search results 202 based on the aggregation 1204 meeting or exceeding the threshold 1436, and the notification 802 is for displaying on the device 102.

The delivery module 1428 can determine which message will be delivered for the user in a number of ways. For example, the delivery module 1428 can include an aggregator module 1430. The aggregator module 1430 calculates the sum of the factors that will be considered for deciding the delivery of the notification 802. For example, the aggregator module 1430 can calculate the aggregation 1204 based on the weighted distance 1416, the weighted relevancy 1418, and the weighted customization 1420. More specifically, equation 1 described in FIG. 12 can calculate the value for the aggregation 1204.

The aggregator module 1430 can calculate the aggregation 1204 in a number of ways. For example, as discussed earlier in equation 1 in FIG. 12, the aggregation 1204 represents the summation of the weighted distance 1416, the weighted relevancy 1418, and the weighted customization 1420. For a specific example, as discussed earlier, the weighted distance 1416, the weighted relevancy 1418, and the weighted customization 1420 of "Lee's Chinese" can be the following respectively: "5," "100," and "500." The aggregation 1204 can represent the summation of "5," "100," and "500." The aggregation 1204 can be "605."

The aggregator module 1430 can calculate the aggregation 1204 for each of the search results 202. The aggregator module 1430 can send the aggregation 1204 to a delivery determination module 1432.

The delivery module 1428 can include a threshold module 1434. The threshold module 1434 generates the threshold 1436. The threshold 1436 is defined as the minimum value that the aggregation 1204 will be compared against to determine whether to deliver the notification 802 or not.

The threshold module 1434 can generate the threshold 1436 in a number of ways. For example, the manufacturer, the user, or the combination thereof can upload a data file, such as a CD or DVD, into the threshold module 1434. The data file can include the values for the threshold 1436. The values can include numerical values, alphabetical values, or the combination thereof. For a specific example, the data file can predefine the value for the threshold 1436 to be "600."

As a different example, the threshold 1436 can represent the highest sum for the aggregation 1204. For a specific example, the aggregation 1204 for "Lee's Chinese" can be "605." The threshold 1436 can be "605." The threshold module 1434 can send the threshold 1436 to the delivery determination module 1432.

The delivery module 1428 can include the delivery determination module 1432. The delivery determination module 1432 determines whether the notification 802 can be delivered to the user. The delivery determination module 1432 determines whether the aggregation 1204 met or exceeded the threshold 1436 for delivering the notification 802 to display on the device 102. The delivery determination module 1432 can also generate the notification 802 once the aggregation 1204 is determined to have met or exceeded the threshold 1436.

The delivery determination module 1432 can determine whether the aggregation 1204 met or exceed the threshold 1436 in a number of ways. For example, the threshold 1436 can be "605." The aggregation 1204 for "Lee's Chinese" being "605," the aggregation 1204 for "Lee's Chinese" will meet the threshold 1436. The delivery determination module 1432 can determine that since the aggregation 1204 for "Lee's Chinese" has met the threshold 1436, the notification 802 for "Lee's Chinese" can be generated and delivered for a display on the device 102.

The delivery determination module 1432 can generate the notification 802 in a number of ways. For example, the delivery determination module 1432 can include a repository that stores information for "Lee's Chinese." The information can include the address, advertisement promotion, or the combination thereof. The information can be initially uploaded as a data file, such as a CD or DVD, into the delivery determination module 1432 by the manufacturer, the user, or the combination thereof.

As a different example, the first control interface 1322 can receive information from external sources to update the information for "Lee's Chinese" stored in the delivery determination module 1432. The delivery determination module 1432 can generate the notification 802 for "Lee's Chinese" based on the information stored in the repository. The notification delivery module 1412 can deliver the notification 802 to a display module 1438.

In contrast, for example, the aggregation 1204 for "Shogun Sushi" can be "375." If the threshold 1436 is "600," the delivery determination module 1432 will determine that the notification 802 for "Shogun Sushi" will not be generated and delivered for a display on the device 102, as the aggregation 1204 fails to meet or exceed the threshold 1436.

It has been discovered that the present invention provides the entity responsible for delivering the notification 802 to control the priority for delivering the notification 802 by the advertisement delivery system 100. Controlling the values for the distance priority 806, the relevancy priority 808, the customization priority 810, the location matrix 502, the relevancy matrix 602, and the customization matrix 702 enhances the ability of the entity to control the delivery of the notification 802 and, thus, fulfilling the monetization purposes of the entity. By controlling the mentioned values, the entity can control the outcome of the equation 1 as described in FIG. 12 or the calculation of the aggregation 1204. Subsequently, the entity can also control the threshold module 1434 generating the threshold 1436 and the delivery determination module 1432 determining which notification 602 to be delivered to the user.

For illustrative purposes, the advertisement delivery system 100 is described with the delivery determination module 1432 determining whether the aggregation 1204 is meeting or exceeding the threshold 1436, although it is understood that the advertisement delivery system 100 can operate the delivery determination module 1432 differently. For example, the delivery determination module 1432 can track the aggregation 1204 that met or exceeded the threshold 1436.

As a specific example, the delivery determination module 1432 can track and store the aggregation 1204 that met the threshold 1436. As a different example, the delivery determination module 1432 can track and store the aggregation 1204 that exceeded the threshold 1436.

The delivery determination module 1432 can generate a history 1440 of the aggregation 1204 previously calculated. For example, the history 1440 is defined as the collection of the aggregation 1204 previously calculated that met, exceeded, or the combination thereof the threshold 1436.

The delivery determination module 1432 can generate the history 1440 in a number of ways. For example, the delivery determination module 1432 can generate the history 1440 based on the selection 204. As a specific example, the history 1440 can represent the aggregation 1204 that met, exceeded, or the combination thereof of the selection 204 representing "Chinese food." As a different example, the history 1440 can represent the aggregation 1204 that met, exceeded, or the combination thereof of the category of interest 206 representing "restaurant." The delivery determination module 1432 can send the history 1440 to the aggregator module 1430.

The advertisement delivery system 100 can include the display module 1438. The display module 1438 displays the visual message, plays the audio message, or the combination thereof to the user. For example, the display module 1438 can display the notification 802 to the user.

The display module 1438 can display the notification 802 in a number of ways. For example, the display module 1438 can display the notification 802 on the display interface 804 for the user to see. As a different example, the display module 1438 can play the notification 802 representing an audio message for the user to hear.

For illustrative purposes, the advertisement delivery system 100 is described with the display module 1438 displaying the notification 802, although it is understood that the advertisement delivery system 100 can operate the display module 1438 differently. For example, the display module 1438 can receive the user's acceptance of the notification 802 delivered by the advertisement delivery system 100. For a further example, the display module 1438 can receive the notification acceptance 812.

The display module 1438 can receive the notification acceptance 812 in a number of ways. For example, the display module 1438 can include a notification acceptor module 1446. The display module 1438 can display the notification 802 for "Lee's Chinese" on the display interface 804. The user can select the notification acceptance 812 as described in FIG. 8 for accepting the notification 802 for "Lee's Chinese." The notification acceptor module 1446 can receive the notification acceptance 812 made by the user for accepting the notification 802 for "Lee's Chinese." As a different example, the display module 1438 can play the notification 802 representing an audio message for "Lee's Chinese." The user can reply "YES" for accepting the notification 802 for "Lee's Chinese." The notification acceptor module 1446 can receive the user's reply of "YES." The notification acceptor module 1446 can send the notification acceptance 812 to a route generator module 1442, a tracking trend module 1444, or the combination thereof.

The advertisement delivery system 100 can include the route generator module 1442. The route generator module 1442 generates a path for the user to reach the target destination. For example, the route generator module 1442 can generate the route 814 of FIG. 8 for the user to reach the destination 816 of FIG. 8 from the current location 302.

The route generator module 1442 can generate the route 814 in a number of ways. For example, the route generator module 1442 selects the target destination based on the notification 802 accepted by the user. For example, the route generator module 1442 can select the destination 816 based on the notification acceptance 812.

For a specific example, the notification acceptance 812 can represent the acceptance of the notification 802 for "Lee's Chinese." The route generator module 1442 can include a map file that includes the address information for restaurants. The map file can be preinstalled by the manufacturer, the user, or the combination thereof from a data file, such as CD or DVD. The route generator module 1442 can select the destination 816 representing "Lee's Chinese" based on the notification acceptance 812 out of the restaurants listed on the map file. The route generator module 1442 can generate the route 814 to the destination 816 representing "Lee's Chinese" for displaying on the device 102.

For illustrative purposes, the advertisement delivery system 100 is described with the display module 1438 displaying the notification 802, although it is understood that the advertisement delivery system 100 can operate the display module 1438 differently. For example, the display module 1438 can display the route 814 generated by the route generator module 1442.

The advertisement delivery system 100 can include the tracking trend module 1444. The tracking trend module 1444 tracks the messages that have been accepted by the user. For example, the tracking trend module 1444 can track the acceptance trend 1102 for the notification 802.

The tracking trend module 1444 can track the acceptance trend 1102 in a number of ways. For example, as illustrated in FIG. 11, the tracking trend module 1444 can track the acceptance trend 1102 by tracking the pattern for the number of acceptance made by the user based on the frequency of the notification acceptance 812 within a week for the category of interest 206. As a different example, the tracking trend module 1444 can track the acceptance trend 1102 by tracking the frequency of the notification acceptance 812 when the distance priority 806 was higher than the relevancy priority 808, the customization priority 810, or the combination thereof.

For illustrative purposes, the advertisement delivery system 100 is described with the tracking trend module 1444 tracking the acceptance trend 1102, although it is understood that the advertisement delivery system 100 can operate the tracking trend module 1444 differently. For example, the tracking trend module 1444 can extrapolate the acceptance trend 1102 for the notification 802 that a user will likely to select the notification acceptance 812 in the future.

For a specific example, the tracking trend module 1444 can track a pattern that a user has the tendency to accept the notification 802 for the restaurant with the category of interest 206 representing "Japanese" on Tuesdays and Thursdays of each month. Based on the past pattern of the acceptance of the notification 802, the tracking trend module 1444 can extrapolate the acceptance trend 1102 that the user will likely accept the notification 802 for the restaurant with the category of interest 206 representing "Japanese" on Tuesdays and Thursdays for next month. The tracking trend module 1444 can send the acceptance trend 1102 to the notification delivery module 1412.

For illustrative purposes, the advertisement delivery system 100 is described with the weighted customization generator module 1426 generating the weighted customization 1420 with the search results 202 sharing the common attribute 402 that is predefined, although it is understood that the advertisement delivery system 100 can operate the weighted customization generator module 1426 differently. For example, the weighted customization generator module 1426 can apply the acceptance trend 1102, the history 1440, or the combination thereof for further generating the weighted customization 1420.

More specifically, the acceptance trend 1102 and the history 1440 can be the common attribute 402 shared amongst the search results 202. For example, if the common attribute 402 includes the history 1440, the weighted customization generator module 1426 can extract the search results 202 having the history 1440 as the common attribute 402 from the search results 202 without that common attribute 402. For another example, if the common attribute 402 includes the acceptance trend 1102 for accepting the notification 802 on every third Tuesdays of each month, the weighted customization generator module 1426 can extract the search results 202 having the acceptance trend 1102 as the common attribute 402 from the search results 202 without that common attribute 402.

The physical transformation from generating the notification 802 results in movement in the physical world, such as people using the first device 102 of FIG. 1, the vehicle, or a combination thereof, based on the operation of the advertisement delivery system 100. As the movement in the physical world occurs, the movement itself creates additional information that is converted back to the notification 802, the distance priority 806, the relevancy priority 808, the route 814, or the combination thereof for the continued operation of the advertisement delivery system 100 and to continue the movement in the physical world.

The first software 1326 of FIG. 13 of the first device 102 of FIG. 13 can include the advertisement delivery system 100. For example, the first software 1326 can include the entry module 1402, the search result generator module 1414, the notification delivery module 1412, the priority module 1404, the display module 1438, the tracking trend module 1444, and the route generator module 1442.

The entry module 1402 can represent the first user interface 1318 of FIG. 13. The selection 204, the common attribute 402, the user's priority 1202, or the combination thereof can be entered or selected into the first user interface 1318. The first control unit 1312 of FIG. 13 can execute the first software 1326 for the search result generator module 1414 to receive the selection 204 and the common attribute 402 from the entry module 1402. The first control unit 1312 can execute the first software 1326 for the priority module 1404 to receive the user's priority 1202 from the entry module 1402. The first control unit 1312 can also execute the first software 1326 to operate the first communication unit 1316 of FIG. 13 and the location unit 1320 of FIG. 13.

The first control unit 1312 can execute the first software 1326 for the search result generator module 1414 to generate the search results 202. The first control unit 1312 can execute the first software 1326 for the search result generator module 1414 to send the search results 202 to the notification delivery module 1412. The first control unit 1312 can execute the first software 1326 for the priority module 1404 to generate the distance priority 806, the relevancy priority 808, the customization priority 810, or the combination thereof. The first control unit 1312 can execute the first software 1326 for the priority module 1404 to send the distance priority 806, the relevancy priority 808, the customization priority 810, or the combination thereof to the notification delivery module 1412. The first control unit 1312 can execute the first software 1326 for the notification delivery module 1412 to receive the search results 202, the distance priority 806, the relevancy priority 808, the customization priority 810, or the combination thereof.

The first control unit 1312 can execute the first software 1326 for the notification delivery module 1412 to generate and deliver the notification 802 to the display interface 804. The first control unit 1312 can execute the first software 1326 for the display module 1438 to receive and display the notification 802.

The display module 1438 can represent the first display interface 1330 of FIG. 13. The notification 802 can be accepted by entering or selecting the notification acceptance 812. The first control unit 1312 can execute the first software 1326 for the display module 1438 to send the notification acceptance 812 to the route generator module 1442 and the tracking trend module 1444. The first control unit 1312 can execute the first software 1326 for the route generator module 1442 and the tracking trend module 1444 to receive the notification acceptance 812.

The first control unit 1312 can execute the first software 1326 for the route generator module 1442 to generate and send the route 814 to the display module 1438. The first control unit 1312 can execute the first software 1326 for the display module 1438 to receive and display the route 814 on the display interface 804.

The first control unit 1312 can execute the first software 1326 for the tracking trend module 1444 to track and send the acceptance trend 1102 to the notification delivery module 1412. The first control unit 1312 can execute the first software 1326 for the notification delivery module 1412 to receive the acceptance trend 1102.

The second software 1342 of FIG. 13 of the second device 106 of FIG. 13 can include the advertisement delivery system 100. For example, the second software 1342 can include the entry module 1402, the search result generator module 1414, the notification delivery module 1412, the priority module 1404, the display module 1438, the tracking trend module 1444, and the route generator module 1442.

The entry module 1402 can represent the second user interface 1338 of FIG. 13. The selection 204, the common attribute 402, the user's priority 1202, or the combination thereof can be entered or selected into the second user interface 1338. The second control unit 1334 of FIG. 13 can execute the second software 1342 for the search result generator module 1414 to receive the selection 204 and the common attribute 402 from the entry module 1402. The second control unit 1334 can execute the second software 1342 for the priority module 1404 to receive the user's priority 1202 from the entry module 1402. The second control unit 1334 can also execute the second software 1342 to operate the second communication unit 1336 of FIG. 13.

The second control unit 1334 can execute the second software 1342 for the search result generator module 1414 to generate the search results 202. The second control unit 1334 can execute the second software 1342 for the search result generator module 1414 to send the search results 202 to the notification delivery module 1412. The second control unit 1334 can execute the second software 1342 for the priority module 1404 to generate the distance priority 806, the relevancy priority 808, the customization priority 810, or the combination thereof. The second control unit 1334 can execute the second software 1342 for the priority module 1404 to send the distance priority 806, the relevancy priority 808, the customization priority 810, or the combination thereof to the notification delivery module 1412. The second control unit 1334 can execute the second software 1342 for the notification delivery module 1412 to receive the search results 202, the distance priority 806, the relevancy priority 808, the customization priority 810, or the combination thereof.

The second control unit 1334 can execute the second software 1342 for the notification delivery module 1412 to generate and deliver the notification 802 to the display interface 804. The second control unit 1334 can execute the second software 1342 for the display module 1438 to receive and display the notification 802.

The display module 1438 can represent the second display interface 1340 of FIG. 13. The notification 802 can be accepted by entering or selecting the notification acceptance 812. The second control unit 1334 can execute the second software 1342 for the display module 1438 to send the notification acceptance 812 to the route generator module 1442 and the tracking trend module 1444. The second control unit 1334 can execute the second software 1342 for the route generator module 1442 and the tracking trend module 1444 to receive the notification acceptance 812.

The second control unit 1334 can execute the second software 1342 for the route generator module 1442 to generate and send the route 814 to the display module 1438. The second control unit 1334 can execute the second software 1342 for the display module 1438 to receive and display the route 814 on the display interface 804.

The second control unit 1334 can execute the second software 1342 for the tracking trend module 1444 to track and send the acceptance trend 1102 to the notification delivery module 1412. The second control unit 1334 can execute the second software 1342 for the notification delivery module 1412 to receive the acceptance trend 1102.

The advertisement delivery system 100 can be partitioned between the first device 102 and the second device 106. For example, the advertisement delivery system 100 can be partitioned into the functional units of the first device 102, the second device 106, or a combination thereof.

As another example, the advertisement delivery system 100 can be partitioned between the first software 1326 and the second software 1342. For example, the second software 1342 can include the search result generator module 1414, the priority module 1404, the notification delivery module 1412, the tracking trend module 1444, and the route generator module 1442. The second control unit 1334 can execute the module partitioned on the second software 1342.

The first software 1326 can include the entry module 1402 and the display module 1438. Based on the size of the first storage unit 1314 of FIG. 13, the first software 1326 can include additional modules of the advertisement delivery system 100. The first control unit 1312 of FIG. 13 can execute the modules partitioned on the first software 1326.

The selection 204, the common attribute 402, and the user's priority 1202 can be entered into the first user interface 1318. The first control unit 1312 can operate the first communication unit 1316 of FIG. 13 to send the selection 204, the common attribute 402, the user's priority 1202, the notification acceptance 812, or the combination thereof to the second device 106.

The second communication unit 1336 of FIG. 13 can send the notification 802 to the first device 102 through the communication path 104 of FIG. 13. The notification 802 can be displayed on the first display interface 1330. The notification 802 can also be displayed on the second display interface 1340 of the second device 106.

It has been also discovered that the present invention provides the point of interests, such as restaurants, that paid fees to deliver the notification 802 to enhance its monetization from delivering the notification 802. The advertisement delivery system 100 enhances the ability of the entity to deliver the notification 812 by influencing the increase of the value of the weighted customization 1420 by increasing the common attribute 402 representing amount of fees paid for advertisement. The advertisement delivery system 100 generating the acceptance trend 1102 improves the delivery of the notification 802 preferred by the user, entity, and the point of interests.

The advertisement delivery system 100 describes the module functions or order as an example. The module can be partitioned differently. For example, the priority module 1404 and the notification delivery module 1412 can be combined. Each of the modules can operate individually and independently of other modules.

Figure 15:
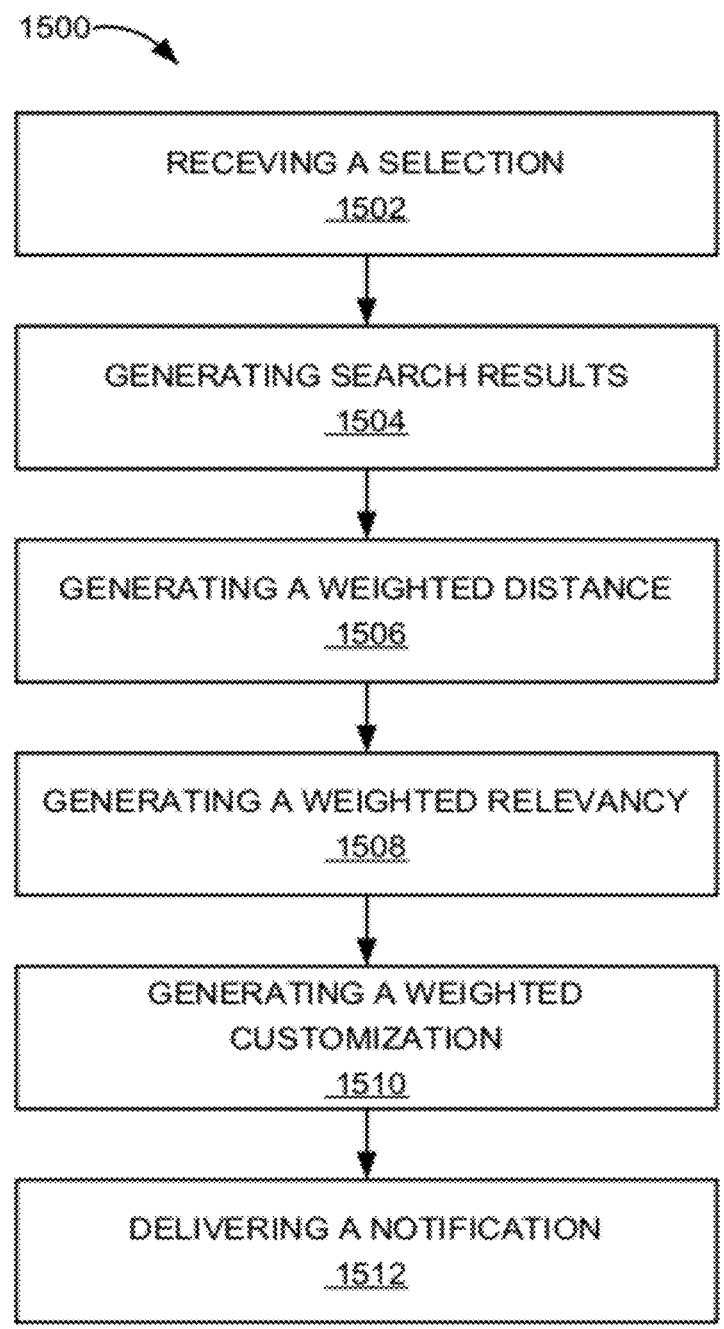
FIG. 15 shows a flow chart of a method of operation of the advertisement delivery system in a further embodiment of the present invention.

Referring now to FIG. 15, therein is shown a flow chart of a method 1500 of operation of the advertisement delivery system 100 in a further embodiment of the present invention. The method 1500 includes: receiving a selection for a category of interest in a block 1502; generating search results for the selection, the search results based on a current location for locating a device providing the selection in a block 1504; generating a weighted distance based on distances of the search results from the current location in a block 1506; generating a weighted relevancy based on relative matches of the search results and the selection in a block 1508; generating a weighted customization with the search results sharing a common attribute that is predefined in a block 1510; and delivering a notification from the search results by an aggregation of the weighted distance, the weighted relevancy, and the weighted customization, the aggregation meeting or exceeding a threshold for displaying on the device in a block 1512.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an advertisement delivery system comprising:
receiving a selection for a category of interest;
generating search results for the selection, the search results based on a current location for locating a device providing the selection;
adjusting a distance priority inversely relative to an adjustment of a relevancy priority based on a type of a geographic area where the current location is detected, wherein the distance priority is decreased while the relevancy priority is increased relative to an abundance of the category of interest within the geographic area;
generating a weighted distance based on distances of the search results from the current location and the distance priority;
generating a weighted relevancy based on relative matches of the search results and the selection;
generating a weighted customization with the search results sharing a common attribute that is predefined;
delivering a notification from the search results by an aggregation of the weighted distance, the weighted relevancy, and the weighted customization, the aggregation meeting or exceeding a threshold for displaying on the device;
tracking an acceptance trend representing a frequency of a notification acceptance of the notification when the distance priority is higher than the relevancy priority, a customization priority, or a combination thereof; and
generating a history of each aggregation for the category of interest that had met or exceeded the threshold wherein the category of interest represents a classification of a user's entry and further wherein the acceptance trend and the history are shared amongst the search results as the common attribute wherein the common attribute having a value re resenting the acceptance trend different from the value representing for the history.

2. The method as claimed in claim 1 wherein generating the weighted distance includes prioritizing the distances of the search results from the current location over the relative matches, the common attribute, or a combination thereof.

3. The method as claimed in claim 1 wherein generating the weighted relevancy includes prioritizing the relative matches of the search results and the selection over the distances, the common attribute, or a combination thereof.

4. The method as claimed in claim 1 wherein generating the weighted customization includes prioritizing the common attribute shared by the search results over the distances, the relative matches, or a combination thereof.

5. The method as claimed in claim 1 further comprising calculating the aggregation based on the weighted distance, weighted relevancy, and the weighted customization includes:
generating the distance priority for prioritizing the distances;
generating the relevancy priority for prioritizing the relative matches; and
generating the customization priority for prioritizing the common attribute.

6. A method of operation of an advertisement delivery system comprising:
receiving a selection for a category of interest;
generating search results for the selection, the search results based on a current location for locating a device providing the selection;
adjusting a distance priority inversely relative to an adjustment of a relevancy priority based on a type of a geographic area where the current location is detected, wherein the distance priority is decreased while the relevancy priority is increased relative to an abundance of the category of interest within the geographic area;
generating a weighted distance based on distances of the search results from the current location and the distance priority;
generating a weighted relevancy based on relative matches of the search results and the selection;
generating a weighted customization with the search results sharing a common attribute that is predefined;

calculating an aggregation based on the weighted distance, the weighted relevancy, and the weighed customization;

delivering a notification from the search results based on the aggregation meeting or exceeding a threshold for displaying on the device;

tracking an acceptance trend representing a frequency of a notification acceptance of the notification when the distance priority is higher than the relevancy priority, a customization priority, or a combination thereof; and generating a history of each aggregation for the category of interest that had met or exceeded the threshold wherein the category of interest represents a classification of a user's entry and further wherein the acceptance trend and the history are shared amongst the search results as the common attribute wherein the common attribute having a value representing for the acceptance trend different from the value representing for the history.

7. The method as claimed in claim 6 wherein generating the weighted customization includes selecting the common attribute out of multiple predefined attributes for the weighted customization.

8. The method as claimed in claim 6 further comprising:
tracking the acceptance trend of the notification; and
wherein generating the weighted customization includes applying the acceptance trend, the history, or a combination thereof for further generating the weighted customization.

9. The method as claimed in claim 6 wherein:
generating the weighted distance includes adjusting the distance priority;
generating the weighted relevancy includes adjusting the relevancy priority; and
generating the weighted customization includes adjusting the customization priority.

10. The method as claimed in claim 6 further comprising:
receiving the notification acceptance; and
selecting a destination based on the notification acceptance.

11. An advertisement delivery system comprising:
a control unit including a control unit for:
receiving a selection for a category of interest;
generating search results for the selection, the search results based on a current location for locating a device providing the selection;
adjusting a distance priority inversely relative to an adjustment of a relevancy priority based on a type of a geographic area where the current location is detected, wherein the distance priority is decreased while the relevancy priority is increased relative to an abundance of the category of interest within the geographic area;
generating a weighted distance based on distances of the search results from the current location and the distance priority;
generating a weighted relevancy based on relative matches of the search results and the selection;
generating a weighted customization with the search results sharing a common attribute that is predefined; and
a communication unit including a microelectronic, coupled to the control unit, for delivering a notification from the search results by an aggregation of the weighted distance, the weighted relevancy, and the weighted customization, the aggregation meeting or exceeding a threshold for displaying on the device wherein:
the control unit is for:
tracking an acceptance trend representing a frequency of a notification acceptance of the notification when the distance priority is higher than the relevancy priority, a customization priority, or a combination thereof; and
generating a history of each aggregation for the category of interest that had met or exceeded the threshold wherein the category of interest represents a classification of a user's entry and further wherein the acceptance trend and the history are shared amongst the search results as the common attribute wherein the common attribute having a value representing for the acceptance trend different from the value representing for the history.

12. The system as claimed in claim 11 wherein the control unit is for prioritizing the distances of the search results from the current location over the relative matches, the common attribute, or a combination thereof.

13. The system as claimed in claim 11 wherein the control unit is for prioritizing the relative matches of the search results and the selection over the distances, the common attribute, or a combination thereof.

14. The system as claimed in claim 11 wherein the control unit is for prioritizing the common attribute shared by the search results over the distances, the relative matches, or a combination thereof.

15. The system as claimed in claim 11 wherein the control unit is for:
generating the distance priority for prioritizing the distances;
generating the relevancy priority for prioritizing the relative matches; and
generating the customization priority for prioritizing the common attribute.

16. The system as claimed in claim 11 wherein the control unit is for calculating the aggregation based on the weighted distance, the weighted relevancy, and the weighed customization.

17. The system as claimed in claim 16 wherein the control unit is for selecting the common attribute out of multiple predefined attributes for the weighted customization.

18. The system as claimed in claim 16 wherein the control unit is for:
generating the history of the aggregation previously calculated;
tracking the acceptance trend of the notification; and
applying the acceptance trend, the history, or a combination thereof for further generating the weighted customization.

19. The system as claimed in claim 16 wherein the control unit is for:
adjusting the distance priority;
adjusting the relevancy priority; and
adjusting the customization priority.

20. The system as claimed in claim 16 wherein the control unit is for:
receiving the notification acceptance; and
selecting a destination based on the notification acceptance.

* * * * *